(12) United States Patent
Kataoka et al.

(10) Patent No.: US 6,215,224 B1
(45) Date of Patent: Apr. 10, 2001

(54) CONTROL DEVICE FOR VIBRATION TYPE ACTUATOR

(75) Inventors: Kenichi Kataoka, Yokohama; Akio Atsuta, Yokosuka; Shinji Yamamoto, Yokohama; Tadashi Hayashi, Yokohama; Jun Ito, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/208,375

(22) Filed: Dec. 10, 1998

(30) Foreign Application Priority Data

Dec. 12, 1997 (JP) ............................................. 9-343457

(51) Int. Cl.⁷ ............................................. H01L 41/08
(52) U.S. Cl. ............................................. 310/316.02
(58) Field of Search ............................... 310/316.02, 317; 318/116

(56) References Cited

U.S. PATENT DOCUMENTS

| | | | |
|---|---|---|---|
| 3,976,945 | 8/1976 | Cox | 328/14 |
| 4,952,834 * | 8/1990 | Okada | 310/316.02 |
| 5,013,982 * | 5/1991 | Sasaki | 310/316.02 |
| 5,173,630 * | 12/1992 | Tanaka | 310/316.02 |
| 5,198,732 * | 3/1993 | Morimoto | 310/316.02 X |
| 5,359,268 * | 10/1994 | Kashiyama | 310/316.02 |
| 5,563,464 * | 10/1996 | Okubu et al. | 310/316.02 |

FOREIGN PATENT DOCUMENTS

| | | | |
|---|---|---|---|
| 2-184277 | 7/1990 | (JP) | H02N/2/00 |
| 4-351008 | 12/1992 | (JP) | H03K/3/354 |

* cited by examiner

Primary Examiner—Mark O. Budd
(74) Attorney, Agent, or Firm—Fitzpatrick, Cella, Harper & Scinto

(57) ABSTRACT

The present invention relates to a control device for vibration type actuator and, particularly, to an arrangement for forming a driving signal by using a pulse signal. In the invention, a periodic pulse is formed by integral multiplying of a period of a reference pulse, analog signals of first and second values are formed at each period of the periodic pulse, an analog signal of third value between the first and second values is formed in a short time, the analog signals are input to a low-pass filter so as to convert the signals to pulse signals by comparing the outputs of the low-pass filter with reference valves, and thereby the formed driving signal includes frequencies at higher resolution than that of the reference pulse so that the control device provides a drive with higher precision.

28 Claims, 30 Drawing Sheets

CONTROL DEVICE FOR VIBRATION TYPE ACTUATOR

BACKGROUND OF THE INVENTION

1. Field of the Invention

The present invention relates to a driving device for a vibration type actuator to be controlled by a periodic signal generating circuit of which frequency can be digitally adjusted in a small unit.

2. Related Background Art

The speed or the position of a vibration type actuator is controlled by the control of the driving frequency, and periodic signal generating circuits of following types are known for varying the driving frequency:

1) A periodic signal generating circuit disclosed in the U.S. Pat. No. 3,976,945 utilizes integra means and defining, as the delay amount, the time until the integration result by the integral means reaches a value set by D/A converting means thereby generating an arbitrary timing;

2) A periodic signal generating circuit disclosed in the Japanese Patent Application Laid-open No. 4-351008 utilizes a logic element as the delay element and generates an arbitrary timing by selecting an arbitrary number of delay elements, with such control that the total delay time coincides with the reference period;

3) A periodic signal generating circuit disclosed in the Japanese Patent Application Laid-open No. 2-184277 improves the resolution of frequency in pseudo manner by digitally switching the frequency dividing ratio at small intervals and meaning them.

The periodic signal generating circuit disclosed in the U.S. Pat. No. 3,976,945 is associated with a drawback that the desired timing is difficult to obtain unless the current supplied to the integral means is precisely controlled, and, in case of dividing a reference period, there may result a fluctuation in the number of division.

The periodic signal generating circuit disclosed in the Japanese Patent Application Laid-open No. 4-351008 is associated with a drawback that the number of the logic elements required for delay is basically equal to the number of division, so that there is required a vary large number of elements including the number of selecting means for selecting the delay amount.

Also in the periodic signal generating circuit disclosed in the Japanese Patent Application Laid-open No. 2-184277, as the resolution of the frequency is set in pseudo manner, the modulation component of frequency may fall in the audible range.

SUMMARY OF THE INVENTION

One aspect of the present application is to provide a control device for a vibration type actuator in which the driving force is obtained by applying a periodic signal to an electro-mechanical energy conversion element, the control device comprising:

a periodic signal forming circuit for receiving pulses of a reference period and forming a signal of a period of an integral multiple of the reference period of the pulses;

a data setting circuit for setting data for dividing, with an integer, one period of the pulses of the reference period;

an analog signal forming circuit for forming an analog signal based on the signal from the periodic signal forming circuit and the data of the data setting circuit;

a low-pass filter for entering the analog signal from the analog signal forming circuit;

a conversion circuit for converting the output of the low-pass filter, by comparison thereof with a predetermined level, into pulse signals; and a driving circuit for forming the periodic signal from the pulse signal from the conversion circuit thereby driving the electro-mechanical energy conversion element;

wherein the drive is achieved with a higher precision than in the drive with the frequency of the above-mentioned pulse period.

One aspect of the present application is to provide a control device for a vibration type actuator in which the driving force is obtained by applying a periodic signal to an electro-mechanical energy conversion element, the control device comprising:

an analog signal forming circuit for receiving pulses of a reference period and forming a first analog signal and a second analog signal based on a period corresponding to an integral multiple of the period of the pulses and also forming a third analog signal of a value between those of the first and second analog signals for a duration shorter than the period corresponding to the integral multiple of the period of the pulses;

a low-pass filter for entering the analog signals from the analog signal forming circuit;

a conversion circuit for converting the output of the low-pass filter, by comparison thereof with a predetermined level, into pulse signals; and a driving circuit for forming the periodic signal from the pulse signal from the conversion circuit thereby driving the electro-mechanical energy conversion element;

wherein the drive is achieved with a higher precision than in the drive with the frequency of the above-mentioned pulse period.

One aspect of the present application is to provide a control device for a vibration type actuator in which the driving force is obtained by applying a periodic signal to an electro-mechanical energy conversion element, the control device comprising:

a periodic signal forming circuit for receiving pulses of a reference period and forming a signal of a period of an integral multiple of the reference period of the pulses;

a data setting circuit for setting data for dividing, with an integer, one period of the pulses of the reference period;

an analog signal forming circuit for forming an analog signal based on the signal from the periodic signal forming circuit and the data of the data setting circuit;

an integrator for receiving the analog signal from the analog signal forming circuit;

a conversion circuit for converting the output of the integrator, by comparison thereof with a predetermined level, into pulse signals; and a driving circuit for forming the periodic signal from the pulse signal from the conversion circuit thereby driving the electro-mechanical energy conversion element;

wherein the drive is achieved with a higher precision than in the drive with the frequency of the above-mentioned pulse period.

One aspect of the present application is to provide a control device for a vibration type actuator in which the driving force is obtained by applying a periodic signal to an electro-mechanical energy conversion element, the control device comprising:

an analog signal forming circuit for receiving pulses of a reference period and forming a first analog signal and a second analog signal based on a period corresponding to an integral multiple of the period of the pulses and also forming a third analog signal of a value between those of the first and second analog signals for a duration shorter than the period corresponding to the integral multiple of the period of the pulses;

an integrator for receiving the analog signal from the analog signal forming circuit;

a conversion circuit for converting the output of the integrator, by comparison thereof with a predetermined level, into pulse signals; and a driving circuit for forming the periodic signal from the pulse signal from the conversion circuit thereby driving the electro-mechanical energy conversion element;

wherein the drive is achieved with a higher precision than in the drive with the frequency of the above-mentioned pulse period.

One aspect of the present application is to provide a control device for a vibration type actuator in which the driving force is obtained by applying a periodic signal to an electro-mechanical energy conversion element, the control device comprising:

an analog signal forming circuit for receiving pulses of a reference period and forming a first analog signal at a timing based on a period corresponding to an integral multiple of the period of the pulses and also forming a third analog signal of a value smaller than that of the first analog signal for a duration shorter than the period corresponding to the integral multiple of the period of the pulses;

a low-pass filter for entering the analog signals from the analog signal forming circuit;

a conversion circuit for converting the output of the low-pass filter, by comparison thereof with a predetermined level, into pulse signals; and a driving circuit for forming the periodic signal from the pulse signal from the conversion circuit thereby driving the electro-mechanical energy conversion element;

wherein the drive is achieved with a higher precision than in the drive with the frequency of the above-mentioned pulse period.

One aspect of the present application is to provide a control device for a vibration type actuator in which the driving force is obtained by applying a periodic signal to an electro-mechanical energy conversion element, the control device comprising:

an analog signal forming circuit for receiving pulses of a reference period and forming a first analog signal at a timing based on a period corresponding to an integral multiple of the period of the pulses and also forming a third analog signal of a value smaller than that of the first analog signal for a duration shorter than the period corresponding to the integral multiple of the period of the pulses;

an integrator for receiving the analog signal from the analog signal forming circuit;

a conversion circuit for converting the output of the integrator, by comparison thereof with a predetermined level, into pulse signals; and a driving circuit for forming the periodic signal from the pulse signal from the conversion circuit thereby driving the electro-mechanical energy conversion element;

wherein the drive is achieved with a higher precision than in the drive with the frequency of the above-mentioned pulse period.

DESCRIPTION OF THE PREFERRED EMBODIMENTS

First Embodiment

Figure 1:
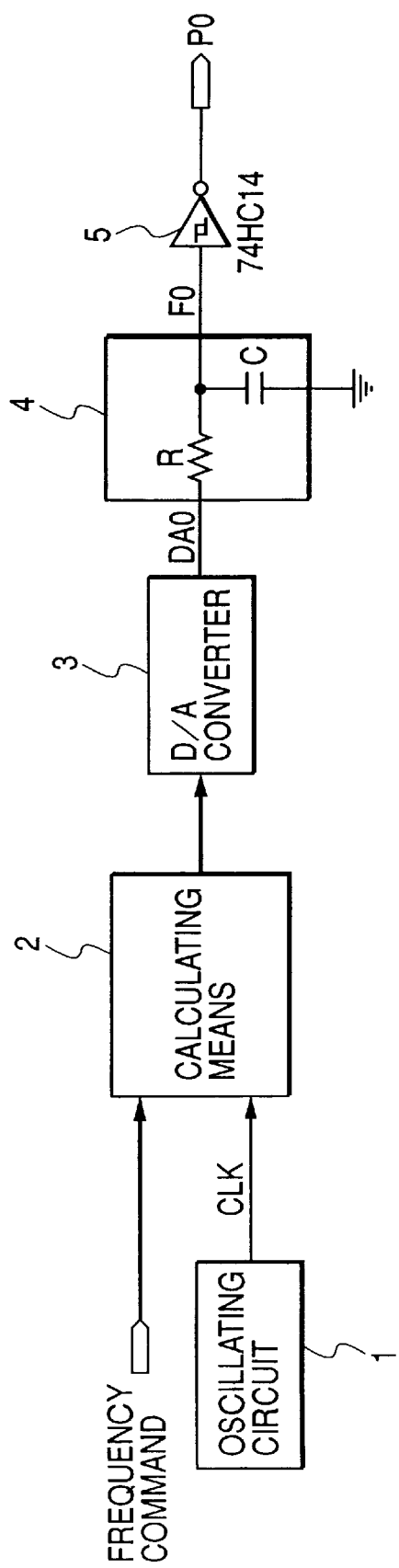
FIG. 1 is a block diagram of a first embodiment.

FIG. 1 is a block diagram showing a first embodiment of the present invention, constituting a periodic signal forming circuit utilizing pulses of a fixed period as reference and adapted to arbitrarily set the relative delay time in order to control the period with a resolution corresponding to an integral fraction of the reference period.

Referring to FIG. 1, there are shown an oscillating circuit 1 utilizing a piezoelectric element such as quartz, a calculating circuit 2 for determining and outputting a delay time at the timing of a clock signal CLK from the oscillating circuit 1 based on a frequency command from unrepresented command means, a D/A converter 3 for converting the output of the calculating circuit into an analog voltage, a low-pass filter 4 composed of a resistor R and a capacitor C, and an inverter (INV) 5 of the known Schmidt trigger input type.

Figure 2:
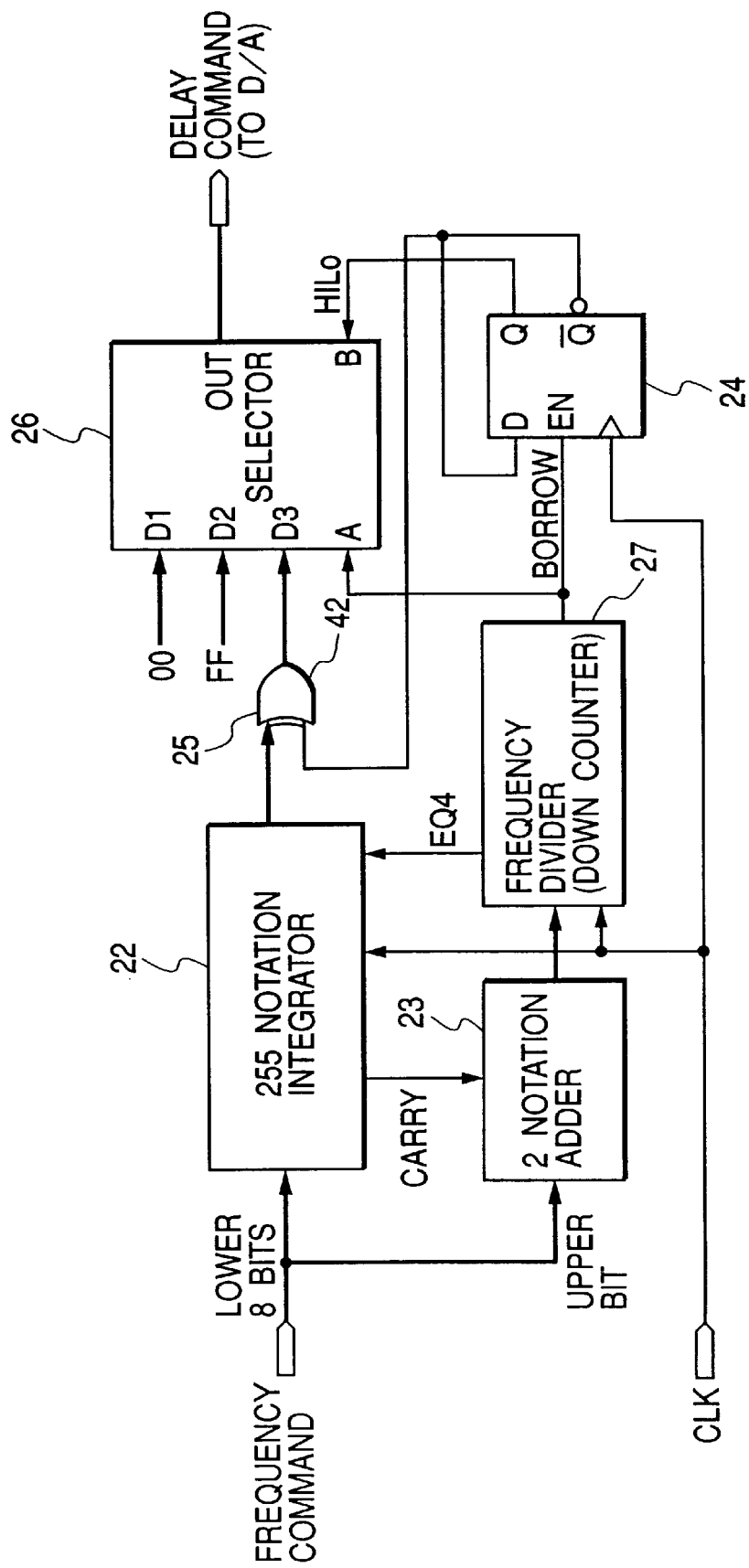
FIG. 2 is a block diagram showing the configuration of calculating means 2 shown in FIG. 1.

FIG. 2 is a block diagram showing the configuration of the calculating circuit 2, wherein a 255-notation integrator 22 receives lower 8 bits of the frequency command from the unrepresented command means, and, when a down-count value of a frequency divider reaches "4" at the timing of the clock signal CLK, and sends an output signal EQ4=1, adds the lower 8 bits (2-notation number) of the frequency command to an 8-bit integrating register (255-notation), thus setting the result of addition in the integrating register and outputting an overflow, if present, to a carry-over signal line.

A 2-notation (binary) adder 23 adds the carry-over signal from the 255-notation integrating register 22 to the upper bits other than the lower 8 bits of the above-mentioned frequency command and outputs the results of addition.

A frequency divider 27 decreases, one by one, the output from the 2-notation adder 23 at the timing of each CLK signal, wherein an output EQ4=1 indicates that the down-count value is 4 and an output signal Borrow=1 indicates that the down-count value is 0. Also when the CLK signal is entered in an output state Borrow=1, the frequency divider 27 receives the output of the 2-notation adder 23 as the count value.

Consequently, the Borrow signal outputs the pulses in a period of the CLK signal, substantially with a period indicated by the upper bit of the frequency command.

A D-flip-flop (DFF) 24 is so constructed as to invert the output at the upshift of the CLK signal, in an output state Borrow=1 of the frequency divider 27.

An exclusive OR (logic addition) element 25 inverts all the outputs of the 255-notation integrator 22 in case the inverted output of the DFF 24 is 1, but releases the outputs of the 255-notation integrator 22 without inversion in case the inverted output of the DFF 24 is 0.

A 3-input 1-output (all 8-bit) selector 26 outputs the input value at an input port D3 to an output port OUT in case the input signal to an input port A is 1. Also in case the input signal to the input port A is 0, the input signal at an input port D1 or D2 is outputted to the output port OUT respectively when the input signal at an input port B is 0 or 1. The input values at input ports D1, D2 are set in advance.

Figure 3:
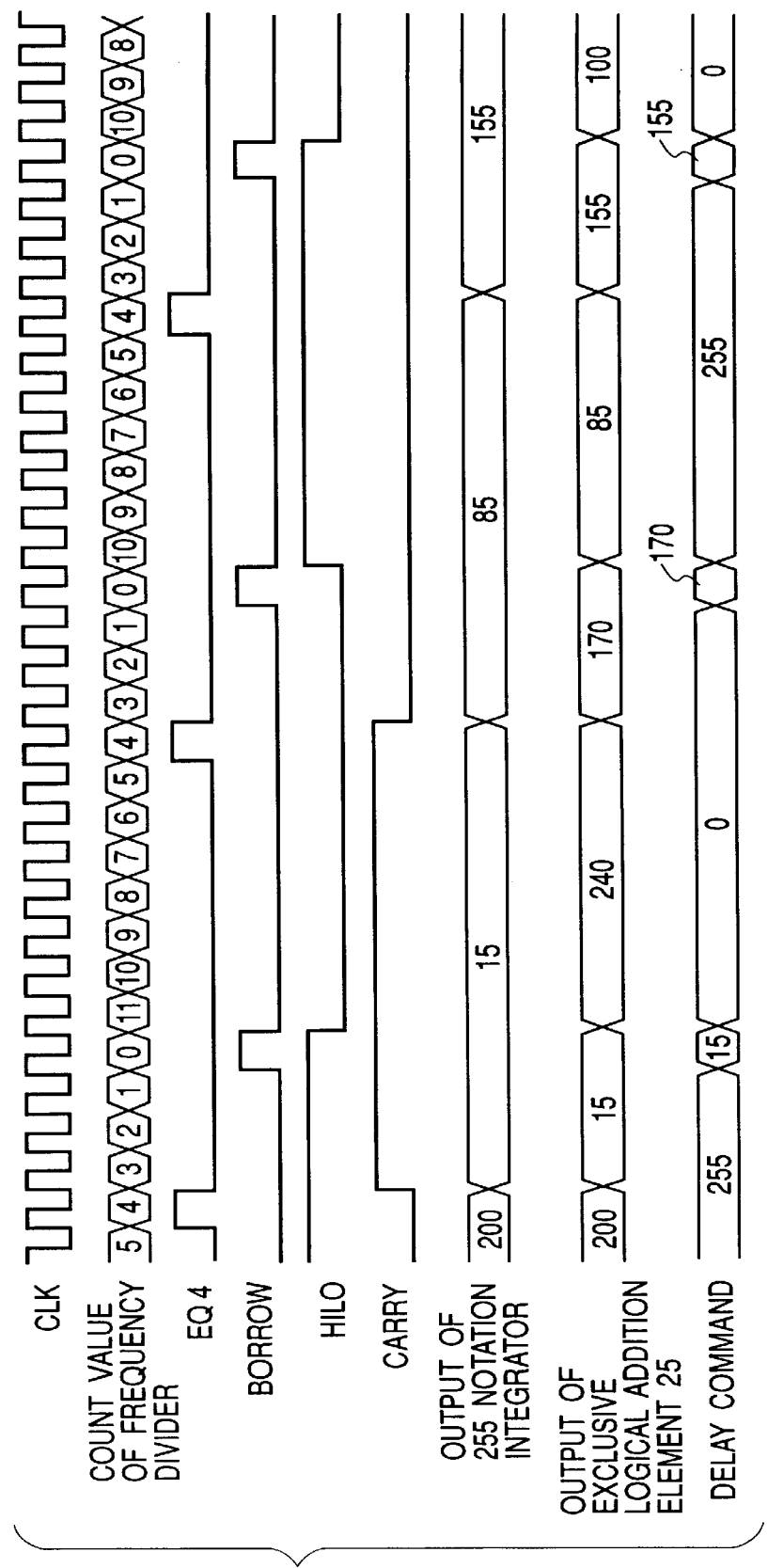
FIG. 3 is a timing chart showing signal wave forms in various parts in FIG. 2.

FIG. 3 shows signal wave forms at various parts in FIG. 2.

Referring to FIG. 3, the frequency divider 27 down counts the output of the 2-notation adder 23 at every period of the CLK signal, and, when the down-counted value reaches "4", the output EQ4 releases a high-level "1" signal for the duration of a CLK pulse. Upon receiving the output EQ4=1, the 255-notation integrator 22 adds the lower 8 bits of the frequency command. For example, if the lower 8 bits of the frequency command have a value "70" and the current count of the 255-notation integrator 22 is "200", the result of addition becomes "270", and, after subtracting the overflow there is outputted an integrated value "15" (270−255). Also a carry signal, indicating the overflow, is supplied to the 2-notation adder 23.

The frequency divider 27 continues the down counting, and, when the count reaches "0", releases an output signal Borrow=1 (high-level) for the duration of a CLK pulse.

In response to the signal Borrow=1, the DFF 24 maintains a HiLo signal from the output port Q at "0" (low-level) until the downshift of a next Borrow=1 pulse, namely during a divided period determined by the frequency divider 27, then maintains the HiLo signal at "1" (high-level) for a next divided period and repeats these cycles. In FIG. 3, the upper bits of the frequency command are set as "10", which is entered into the frequency divider 27 in response to the Borrow=1 signal and is subjected to down counting therein. When the Carry signal=1, a value 10+1=11 is entered in response to the Borrow=1 signal and is subjected to down counting.

On the other hand, as the down count value does not yet reach "0" when the signal EQ4=1 is outputted, an input port of the exclusive OR element 25 receives the integrated value "15" from the integrator 22. In this state, as HiLo signal is at the high-level state, the exclusive OR element 25 outputs "15" which is entered into the input port D3 of the selector 26.

During Borrow=0 and HiLo=1, the selector 26 outputs the value FF (integrated value 255), and, upon receiving the signal Borrow=1 indicating the end of the down counting of the frequency divider 27, it releases, from the output port OUT, the value "15" entered at D3 as a delay command during a CLK pulse.

Also at the start of new down counting in the frequency divider 27 (Borrow=0, HiLo=0), the selector 26 releases a value 00 (integrated value 0) from the output port OUT. Until the output of the value of D3, there is outputted the value 00.

Consequently, the integrated values (1 to 254) of the 255-notation integrator, released from the input port D3 of the selector 26 indicates the amount of displacement (amount of delay) with respect to the edge in a cycle of the CLK signal.

In the example shown in FIG. 3, when the downcount value of the frequency divider 27 reaches "4" while the frequency command has a value "70" and the integrated value of the 255-notation integrator 22 is "15", the output EQ4 becomes "1" whereby the 255-notation integrator 22 newly adds the frequency command "70" and sends the integrated value "85" (70+15) to the exclusive OR element 25. In this state, since the HiLo signal supplied from the DFF 24 to the selector 26 is "0" (low-level), the output of the exclusive OR element 25 becomes an inverted value "170" (255−85) of the integrated value of the 255-notation integrator 22.

Consequently, during the period of a CLK signal in which the signal Borrow=1 is released, a delay command of a value "170" is released from the selector 26.

As explained in the foregoing, the delay command outputted from the selector 26 shown in FIG. 2 alternately assumes "0" and "255", and the calculating means 2 sets the delay data for a cycle of the CLK signal at each switching.

Figure 4:
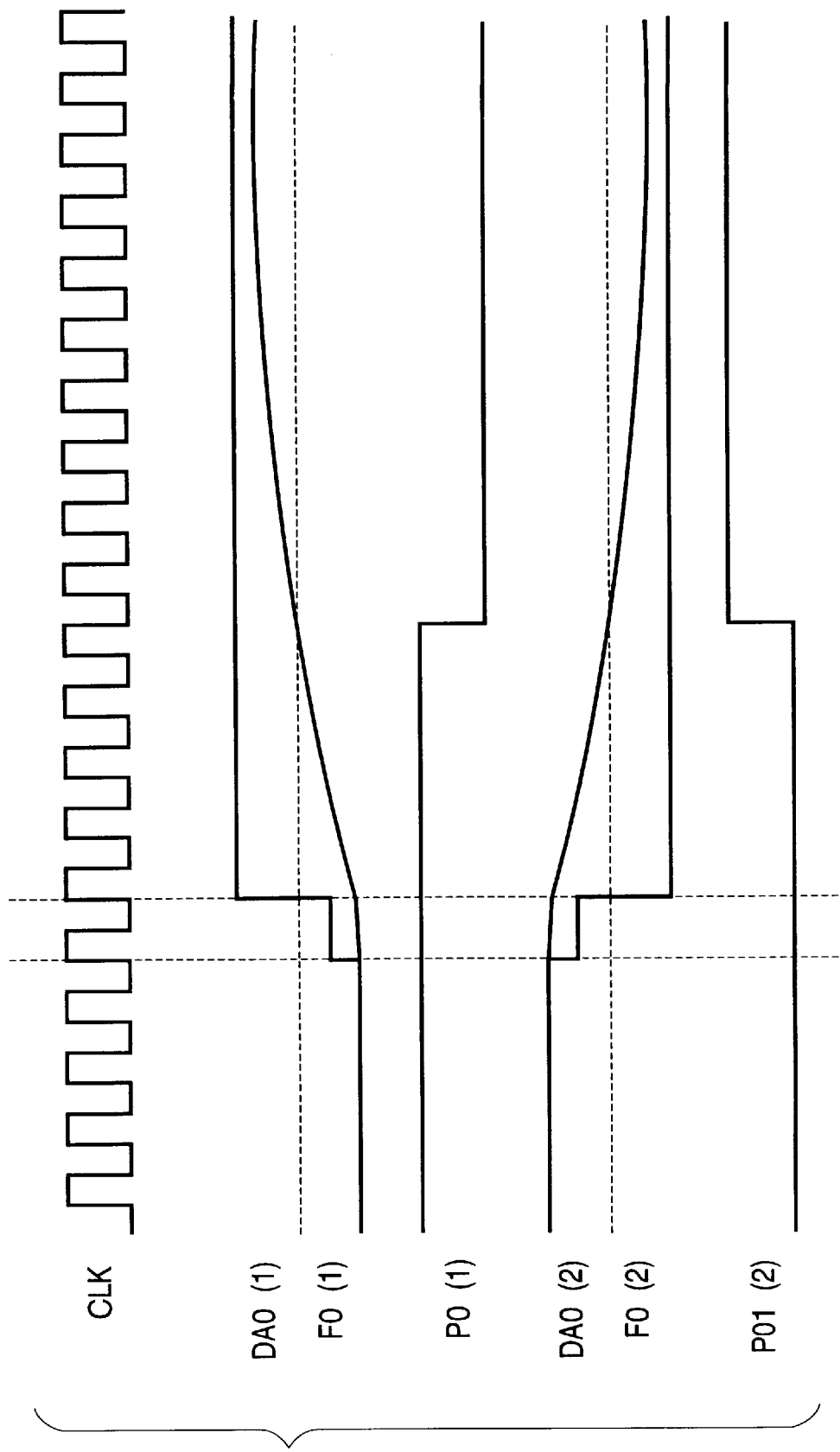
FIGS. 4 and 5 are timing charts showing signal wave forms in various parts in FIG. 1.

FIG. 4 shows the wave forms of the converted output DA0 of the D/A converter 3, the output F0 of the low-pass filter 4 and the output P0 of the inverter 5.

Figure 5:
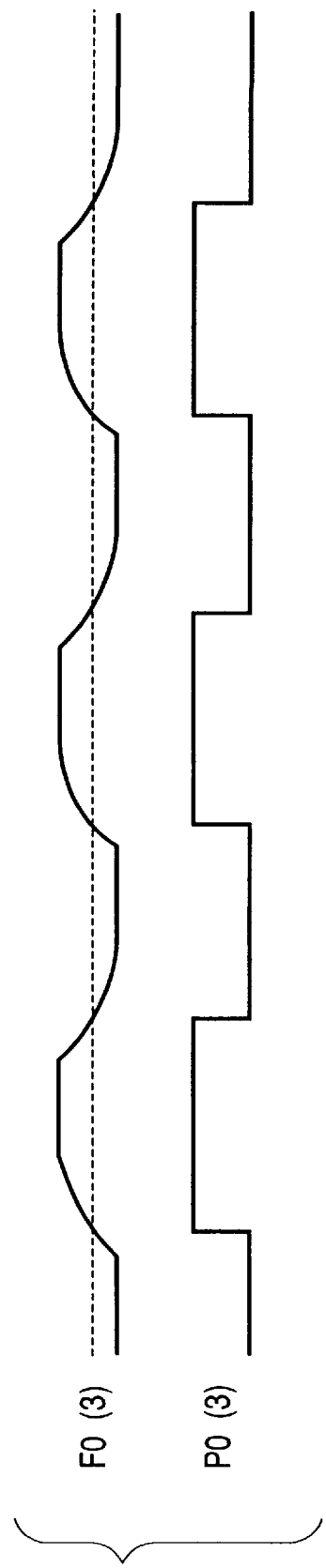

Referring to FIG. 4, the above-mentioned delay data is set for a cycle of the CLK signal, at the output shift of the D/A converter 3 from "0" to "255" or from "255" to "0". A threshold level represented by a broken line indicates the boundary between "0" and "1" of the input to the inverter 5. Also DA0(1), F0(1) and P0(1) indicate one side (upshift side) of the wave form while DA0(2), F0(2) and P0(2) indicate the other side (downshift side) of the wave form, and they are in a mutually inverted relationship. Also FIG. 5 shows wave forms F0, P0 contracted in time.

A signal F0(3), which is an analog signal including the delay time, is released as a square wave P0(3) by a broken-lined threshold level.

In the present embodiment, one cycle of the CLK signal is divided into 255 portions as explained in the foregoing, and the principle of such division will be explained in the following with reference to FIG. 6.

In case the delay data set during a cycle of the CLK signal has a delay amount "0", the output DA0 of the D/A converter 3 assumes a wave form DA0(4) at the change from "0" to "255". Also F0(4) indicates the output of the low-pass filter 4, and P0(4) indicates the output of the inverter 5. The delay data in this case are "255".

Also in case of delay of a cycle of the CLK signal, the above-mentioned signals respectively assume wave forms DA0(7), F0(7) and P0(7). The delay data in this case is set at "0", and the DA0 signal is set at "255" with the delay of a cycle of the CLK signal in comparison with the above-mentioned case of the delay amount 0.

Consequently TD1=TD2, and the timing of upshift of P0(7) is evidently delayed by a cycle of the CLK signal from the upshift of P0(4).

The output of the 255-notation integrator 22 is from "0" to "254", and, with any value in this range being selected as the delay data, the upshift of the signal P0 falls between the upshifts of P0(4) and P0(7), so that one cycle of the CLK signal can be divided into 255 fractions.

Figure 6:
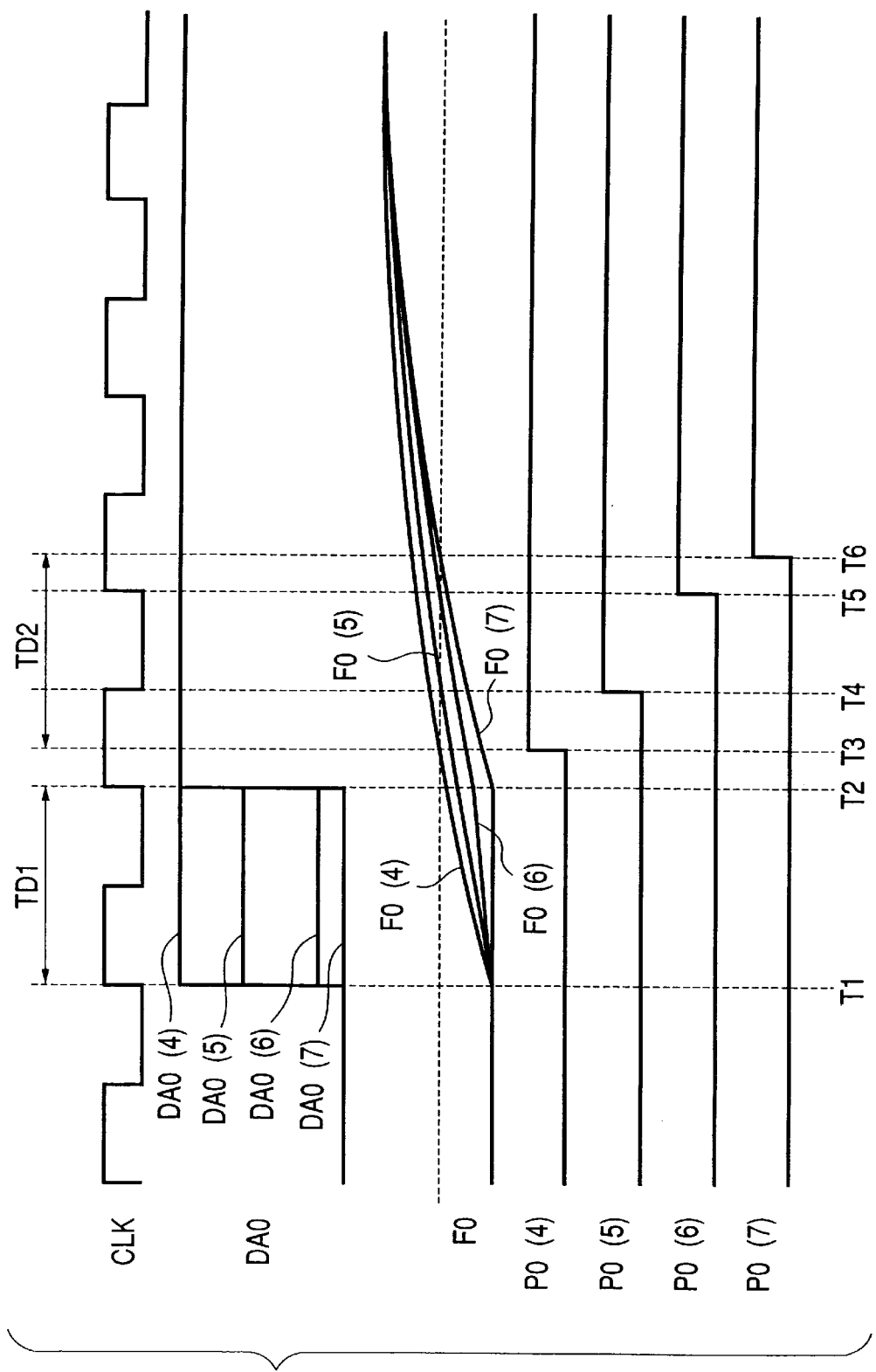
FIG. 6 is a chart showing the principle of a delayed wave form shown in FIG. 1.

Referring to FIG. 6, the delay data DA0 (sampled within a cycle of the CLK signal) converted for example into a voltage provides an increasing output through the low-pass filter 4, with a steeper slope as the delay data become larger or a shallower slope as the delay data become smaller.

Therefore, by dividing the output F0 of the low-pass filter 4 with the broken-lined threshold level of the inverter 5, the amount of delay becomes smaller as the delay data increase (T4<T5<T6).

The delay amounts 0, 1, . . . , 254, 255 respectively correspond to the delay data 255, 254, . . . , 1, 0, and the delay data can be obtained by representing the delay amount with a binary number and inverting such binary number.

In case the output DA0 of the D/A converter 3 changes from "255" to "0", the delay amounts 0, 1, . . . , 255 respectively corresponding to the delay data 0, 1, . . . , 255.

Figure 32:
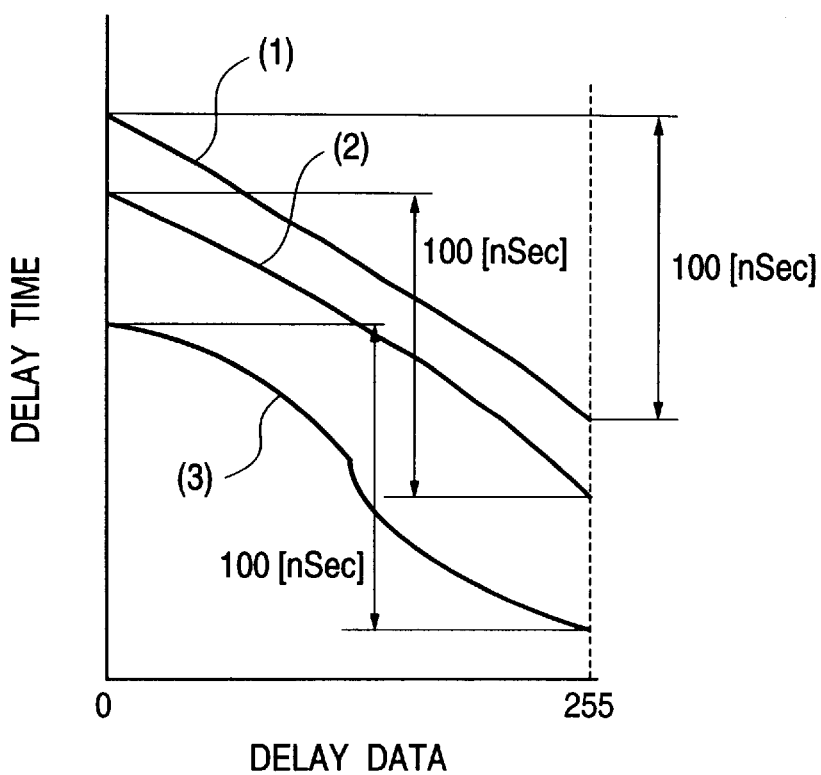
FIG. 32 is a chart showing the relationship between delayed data and delay time, as a function of the time constant of a low-pass filter 4.

The time constant of R, C constituting the low-pass filter 4 is so selected that the output of the low-pass filter 4 at a delay data "255" does not exceed the boundary voltage between inputs "0" and "1" of the inverter 5 in the above-mentioned cycle of the CLK signal. FIG. 32 shows the relationship between the delay data and the delay time, as a function of the time constant. This chart shows an example that a cycle time of the CLK signal is 100 nano-second, in which, in case the time constant is large, the relationship assumes a form (1) wherein the delay time decreases as the delay data (value set in the D/A converter 3) increases. A curve (2) corresponds to a case close to the above-mentioned boundary voltage and shows smooth change as in the case (1). A curve (3) corresponds to a case beyond the above-mentioned boundary voltage and shows a steep change in the inclination in the middle though the full scale is same as in other cases. The boundary voltage is preferably not exceeded since such steep change increases the fluctuation of the frequency.

The function of the foregoing first embodiment can be summarized as follows. The Borrow signal is released for every data represented by the upper bits in the frequency command set in the frequency divider 27 shown in FIG. 2, and the period of such Borrow signal constitutes a reference period. As this reference period is an integral multiple of the period of the clock signal CLK, the reference period becomes an integral multiple of the period of the clock signal, and the output of the D/A converter is alternately switched between "0" and "255" at every reference period. The lower 8 bits of the frequency command are to set the period in a time unit obtained by dividing the clock period with 255, and, immediately before the switching of the output of the D/A converter between "0" and "255", a value corresponding to the lower bits is released as the output of the D/A converter. Consequently, the explained in the foregoing in relation to FIGS. 4, 5 and 6, the period of the pulses from the inverter 5 shown in FIG. 1 becomes equal to the sum of the aforementioned reference period and the data represented by the lower 8 bits, whereby obtained are pulses of a period in the unit defined by dividing the clock period into 255 fractions. When the carry signal is released from the 255-notation integrator 22, "1" is added to the aforementioned upper bits in the adder 23. When the added value of the data of the lower bits integrated in every reference period in the integrator 22 exceeds a clock period, the period of the pulses from the inverter in such addition period is shortened by a clock pulse, and such addition is to correct such shortening of the period.

Second embodiment

Figure 7:
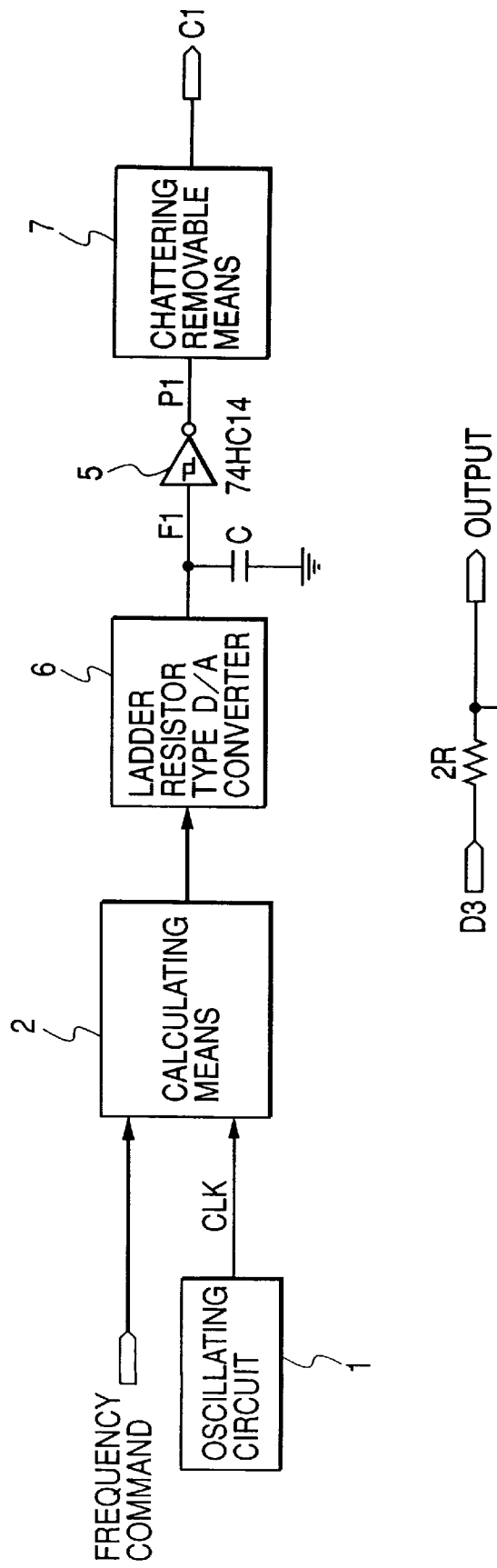
FIG. 7 is a block diagram of a second embodiment.

FIG. 7 is a block diagram showing the periodic signal forming circuit in a second embodiment of the present invention.

In FIG. 7, there are shown a D/A converter 6 of ladder resistor type, and chattering removable means 7 for canceling the chattering generated at a change in the pulse.

Figure 8:
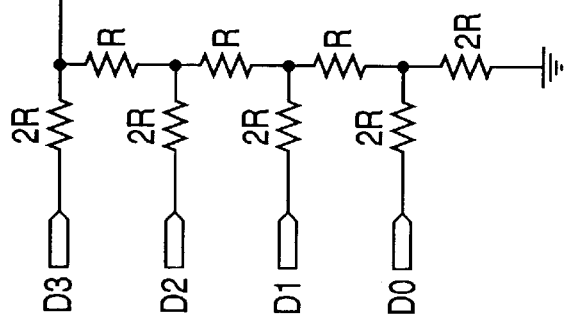
FIG. 8 is a circuit diagram showing the configuration of a ladder resistor type D/A converter shown in FIG. 7.

FIG. 8 is a circuit diagram showing an example of the ladder resistor type D/A converter.

As will be understood from FIG. 8, the ladder resistor type D/A converter is solely composed of resistors (R, 2R), and constitutes a low-pass filter by the relationship between the output resistor of the ladder resistor D/A converter and a capacitor C connected to the output thereof.

For example, the time constant of 1 psec is obtained by selecting R in FIG. 8 as 10 kΩ and capacitor C as 100 pF. The functions are almost same as those in the first embodiment up to the output P1 from the inverter 5. However, if the time constant of the above-mentioned low-pass filter is large, the inverter 5 of the Schmidt trigger type having an input hysteresis becomes susceptible to the influence of noise, whereby chattering may be generated at the output P1.

Figure 9:
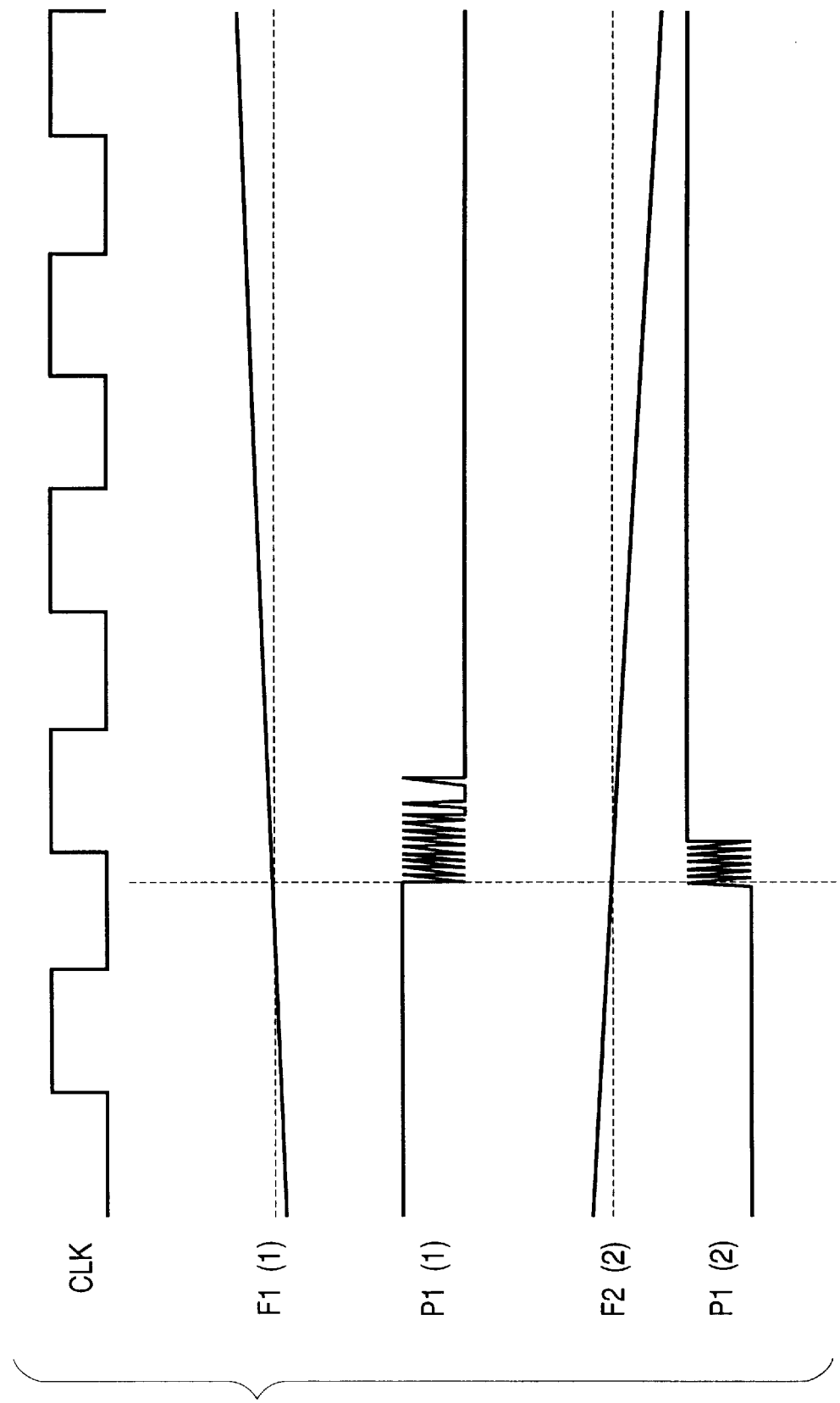
FIG. 9 is a timing chart showing signal wave forms in various parts in FIG. 7.

FIG. 9 shows an example of the chattering, wherein a broken line indicates the boundary between "0" and "1" of the input F1(1) of the inverter 5. The chattering is generated at the change of the output P1 of the inverter 5.

Figure 10:
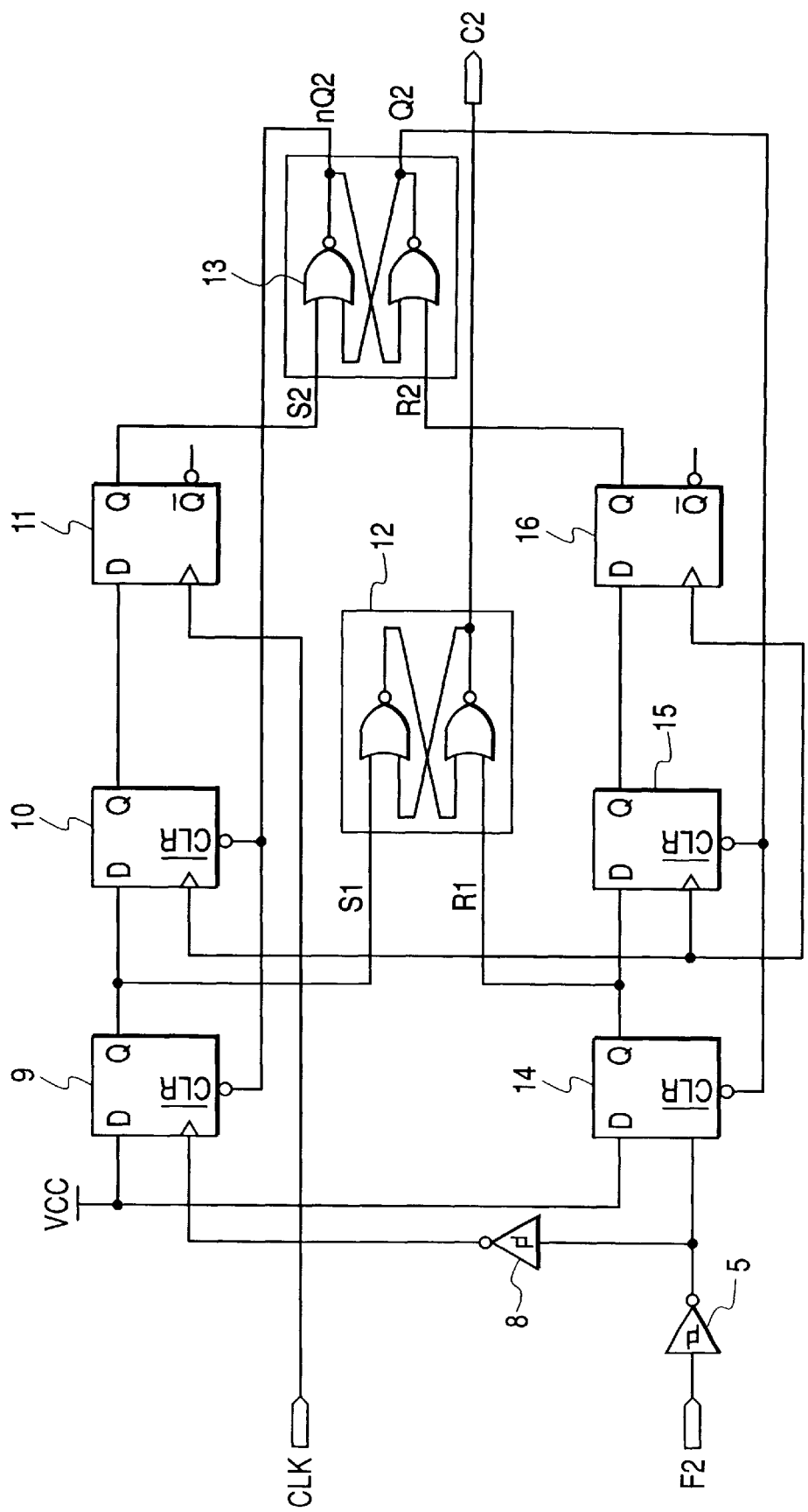
FIG. 10 is a circuit diagram showing an example of chattering removing means shown in FIG. 7.
Figure 11:
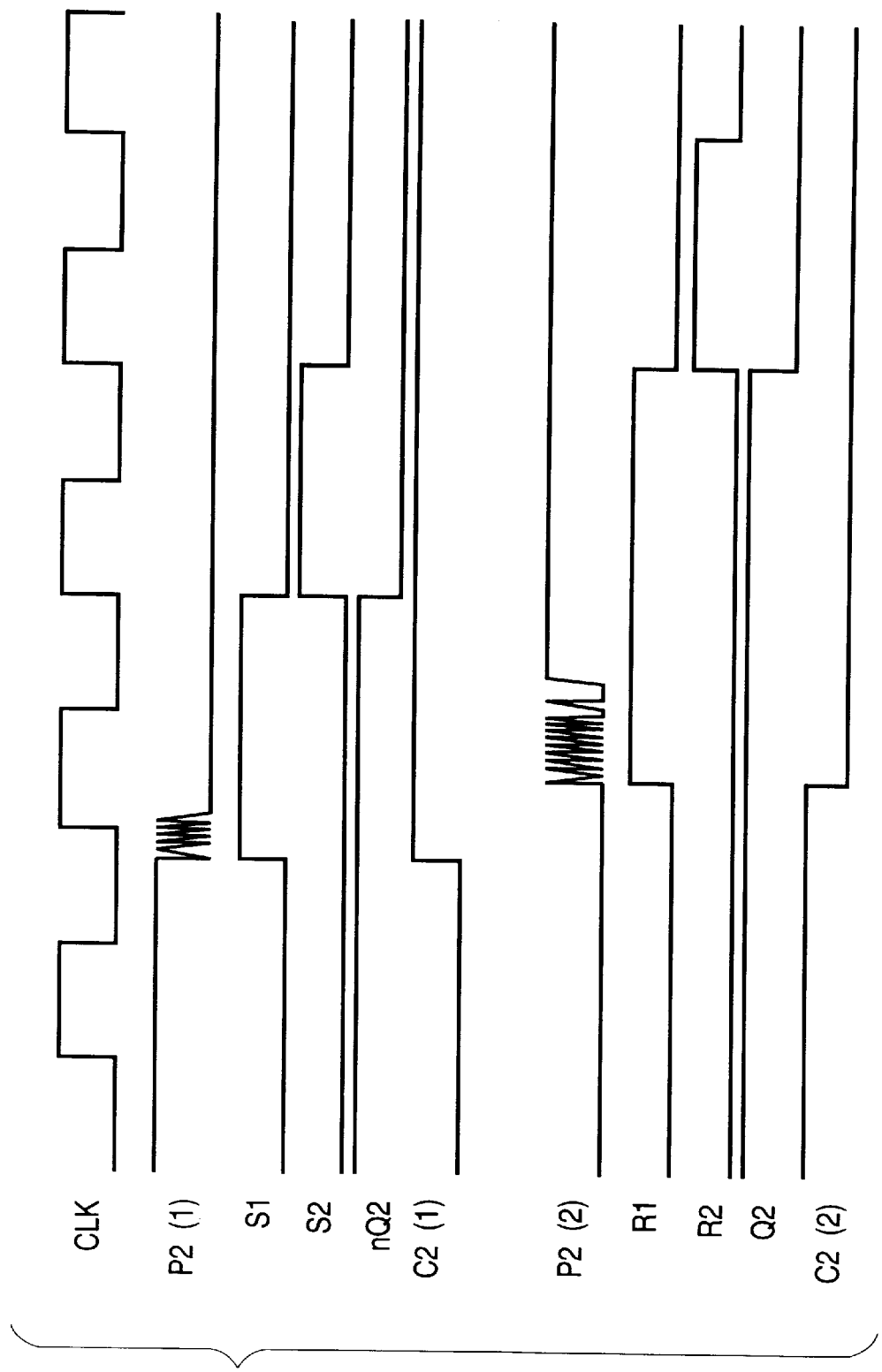
FIG. 11 is a timing chart showing signal wave forms in various parts in FIG. 10.

FIG. 10 shows an example of the circuit structure of the chattering removable means 7, and FIG. 11 is a wave form chart showing the function thereof.

In these drawings there are shown an inverter 8 of the known configuration, D-flip-flops 9, 10, 14, 15 with reset ports, D-flip-flops 11, 16, and RS-flip-flops 12, 13. It will be understood that the chattering is generated in the signal P2, but is removed from the output C2.

Third embodiment

Figure 12:
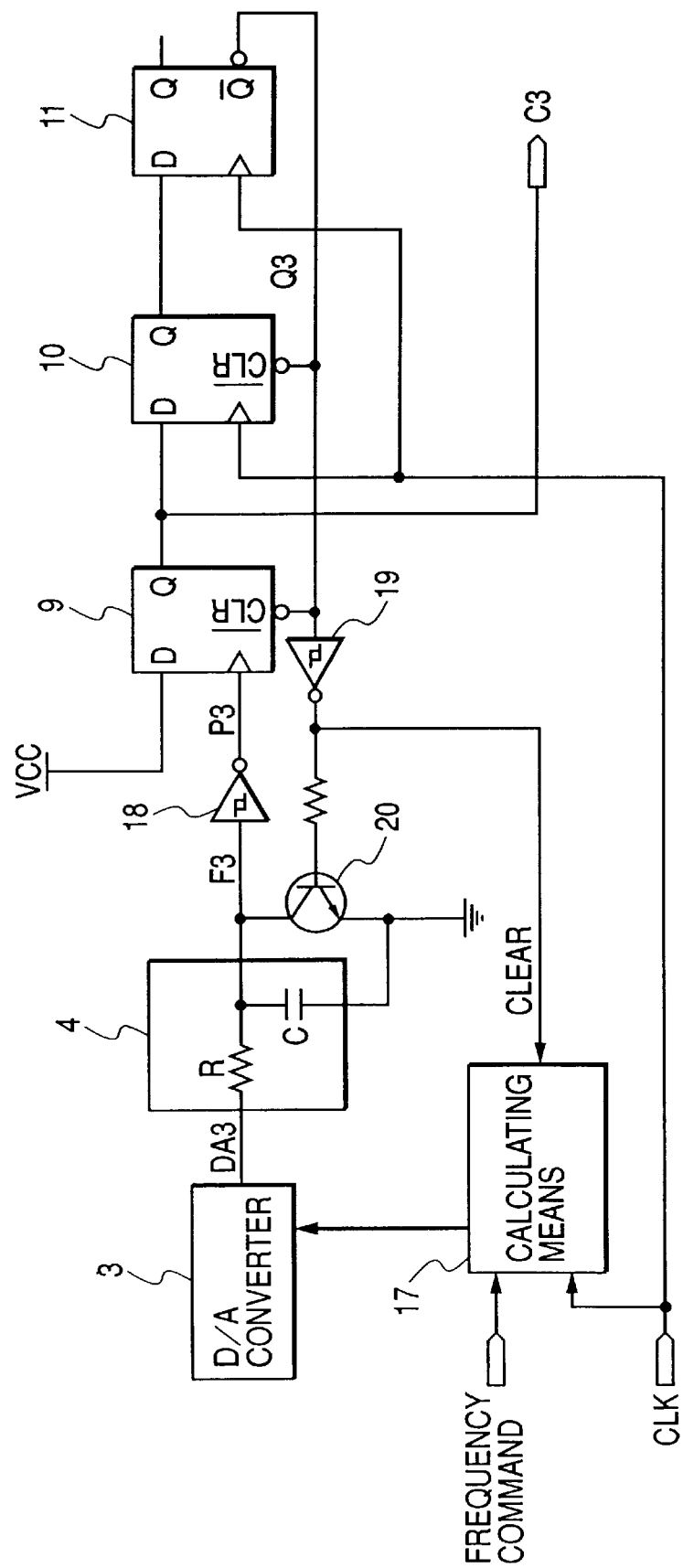
FIG. 12 is a block diagram of a third embodiment.

FIG. 12 is a block diagram showing a third embodiment of the present invention.

In FIG. 12, there are shown calculating means 17 for calculating the delay time based on the frequency command from unrepresented setting means, a buffer (BUFF) 18 of Schmidt trigger input type, an inverter (INV) 19, and a transistor 20 for resetting the charge of the capacitor C of the low-pass filter 4.

In the foregoing first and second embodiments, the delay data are set when the output of the D/A converter changes from "0" to "255" and from "255" to "0", but, in the present embodiment, the delay data are set only at the change from "0" to "511".

The flip-flops 9, 10, 11 so function as to eliminate the chattering at P3, whereby the output after the removal of chattering is released from C3.

Figure 13:
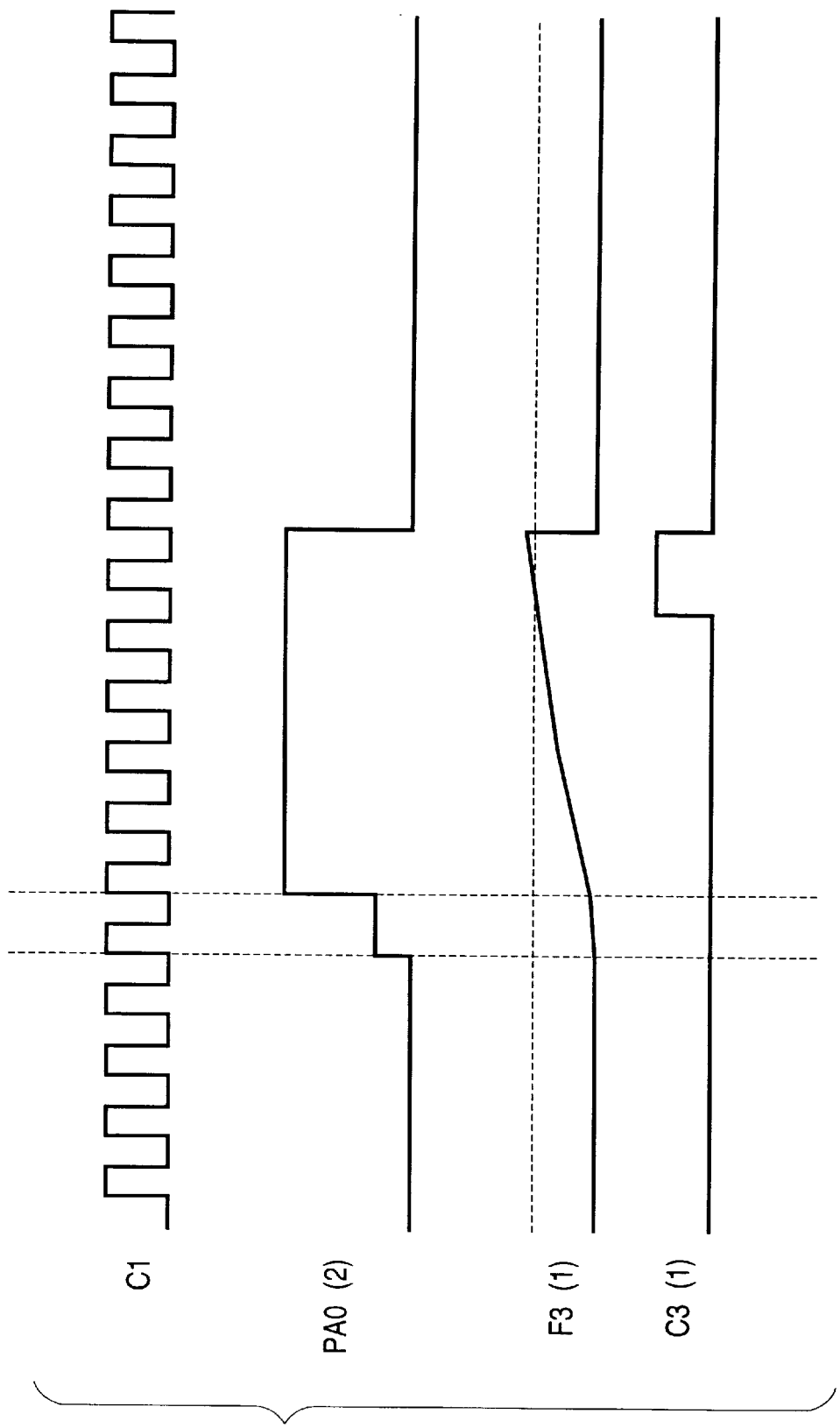
FIGS. 13, 14 and 15 are timing charts showing signal wave forms in various parts in FIG. 12.

FIG. 13 is a wave form chart showing the signal at various parts, wherein the delay data are set form a period of the CLK signal when the output DA3 of the D/A converter 3 changes from "0" to "511". A broken line indicates the boundary between "0" and "1" of the input to the buffer 18.

With the change of the output DA3 from "0" to "511", the signal F3(1) gradually increases to reach the boundary between "0" and "1", whereupon the signal C3(1) is shifted to "1", and all the signals DA3, F3(1) and C3(1) are shifted to "0" thereafter.

Figure 14:
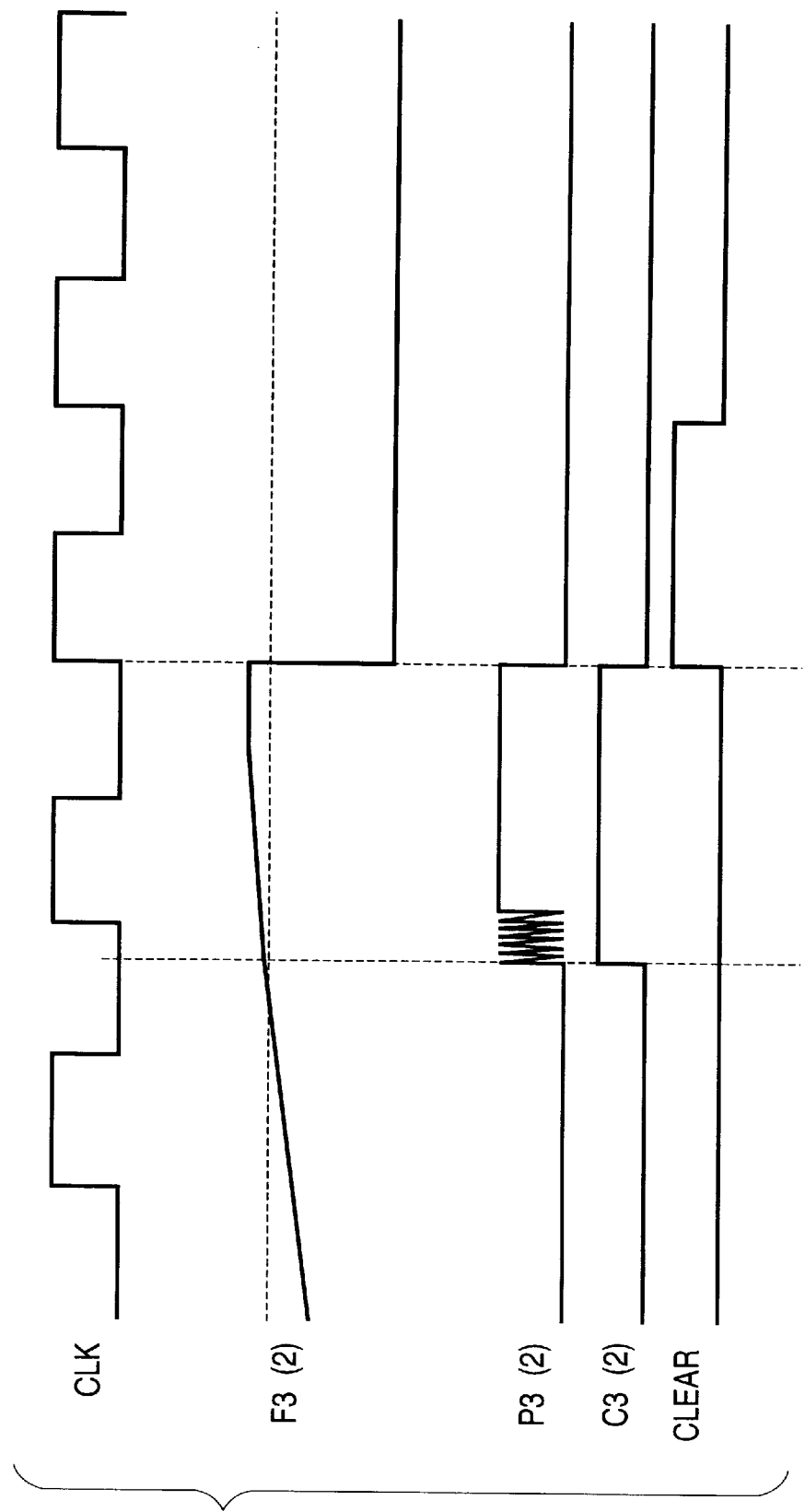

FIG. 14 is wave form charts showing the removal of chattering. The chattering generated at the upshift of the signal P3(2) is removed in the signal C3(2).

Figure 15:
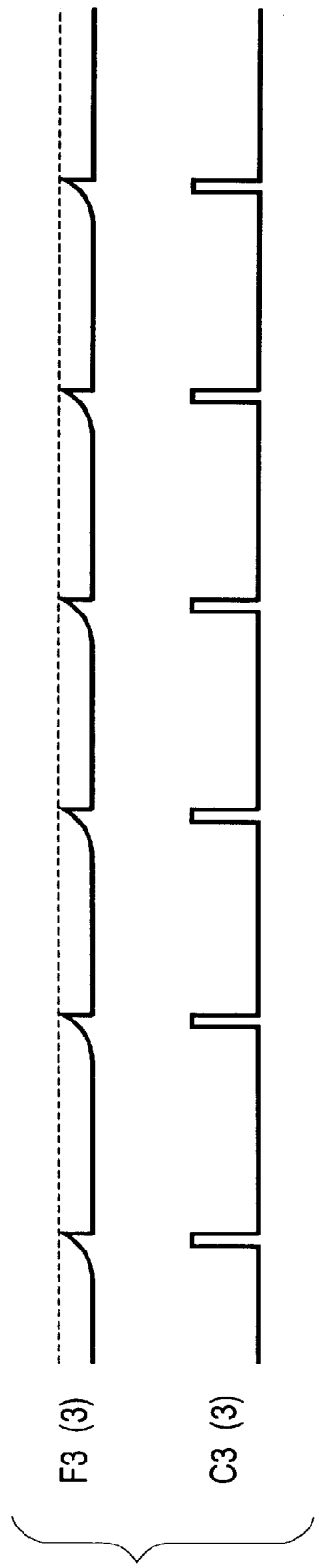

FIG. 15 is a wave form chart showing the signals F3, C3 contracted in time.

Figure 16:
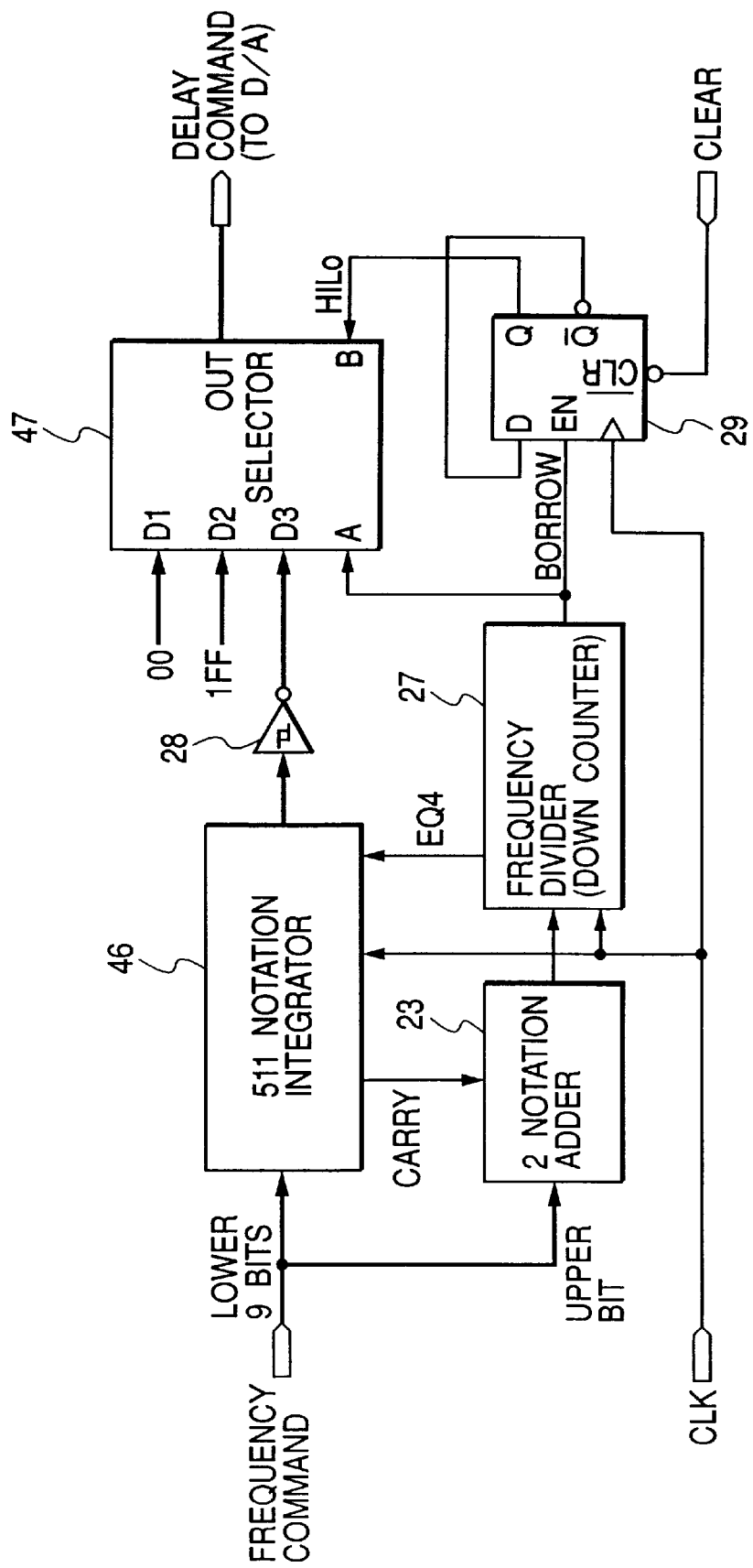
FIG. 16 is a block diagram showing the configuration of calculation means 17.

FIG. 16 is a circuit diagram showing an example of the calculating means 17, wherein shown are an inverter 28 for inverting 9-bit outputs of a 511-notation integrator 46, a D-flip-flop 29 with a reset port, and a 511-notation integrator 46 adapted, at the upshift of the CLK signal in a state EQ4=1, to add the lower 9 bits (2-notation number) of the frequency command set by the unrepresented setting means to an internal integrating register (511-notation number) and to set the result in the integrating register in the 511-notation number.

In case of overflow of the 511-notation integrator 46, there is released a Carry signal "1". A 2-notation adder 23 adds the Carry signal to the upper bits, obtained by eliminating the lower 9 bits from the frequency command from the unrepresented setting means.

A frequency divider 27 executes stepwise down-counting at the timing of the CLK signal, and a state EQ4=1 indicates that the count value is "4", while a state Borrow=1 indicates that the count value is "0". When a CLK signal is entered in a state Borrow=1, the output value of the 2-notation adder 23 is entered into the count value.

Consequently, in response to the signal Borrow=1, the pulses of a period of the CLK signal are outputted substantially in a period represented by the upper bits of the frequency command. The D-flip-flop (DFF) 29 inverts the output at the upshift of the CLK signal in case of Borrow=1, and is reset by a signal Clear=0.

Figure 17:
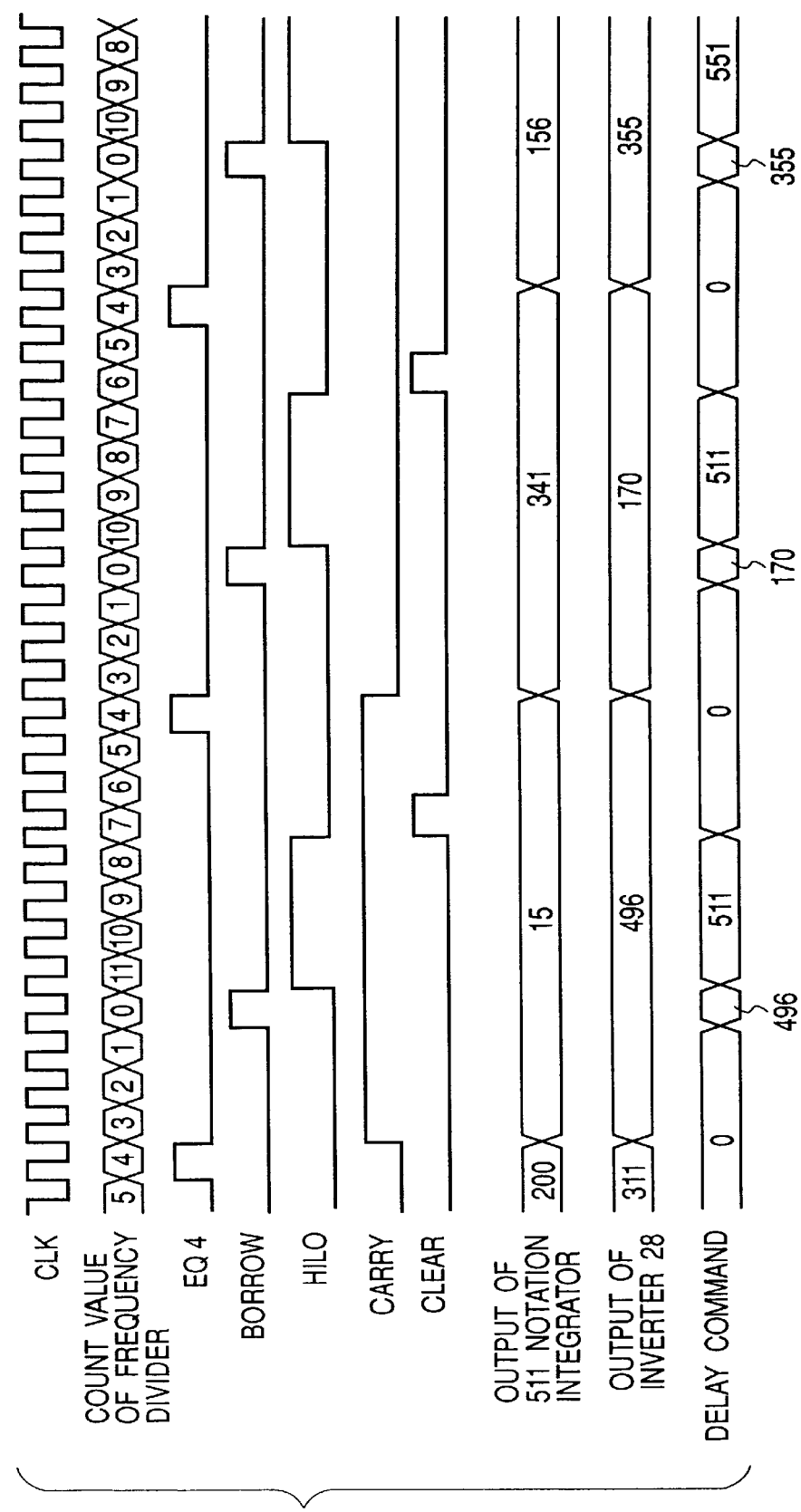
FIG. 17 is a timing chart showing signal wave forms in various parts in FIG. 16.

The inverter 28 inverts all the outputs of the 511-notation integrator 4. A selector 47 with three input and one output (each 9 bits) outputs the signal at D3 to OUT in case A=1, but, in case A=0, outputs the signal at D1 or D2 to OUT respectively if B is 0 or 1. FIG. 17 is a wave form chart showing the function.

When the delay command is shifted to Borrow=1, the signal changes from "0" to "511", during which the delay data are set for a duration of a CLK clock signal. In response to Clear=1, the delay command is reset to "0".

Fourth embodiment

Figure 18:
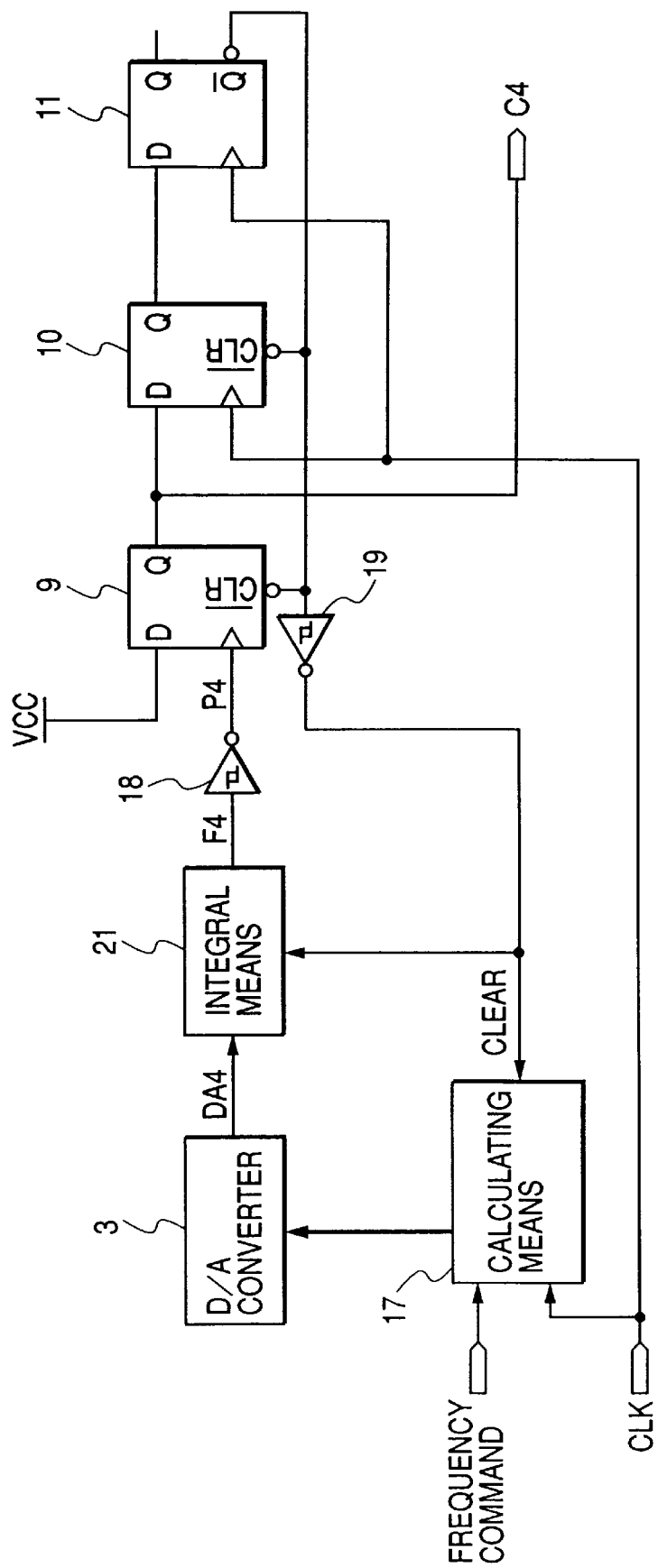
FIG. 18 is a block diagram of a fourth embodiment.

FIG. 18 is a block diagram showing a fourth embodiment of the present invention, wherein shown is integral means 21. In the foregoing third embodiment, the output of the D/A converter is entered into the low-pass filter, but, in the present fourth embodiment, it is entered into the integral means 21.

In the foregoing embodiment employing the low-pass filter as shown in FIG. 12, the output signal F3 shows an exponential change, but, in the present embodiment employing the integral means 21, the output F4 thereof shows a linear change, whereby the linearity of the delay time can be improved.

Figure 19:
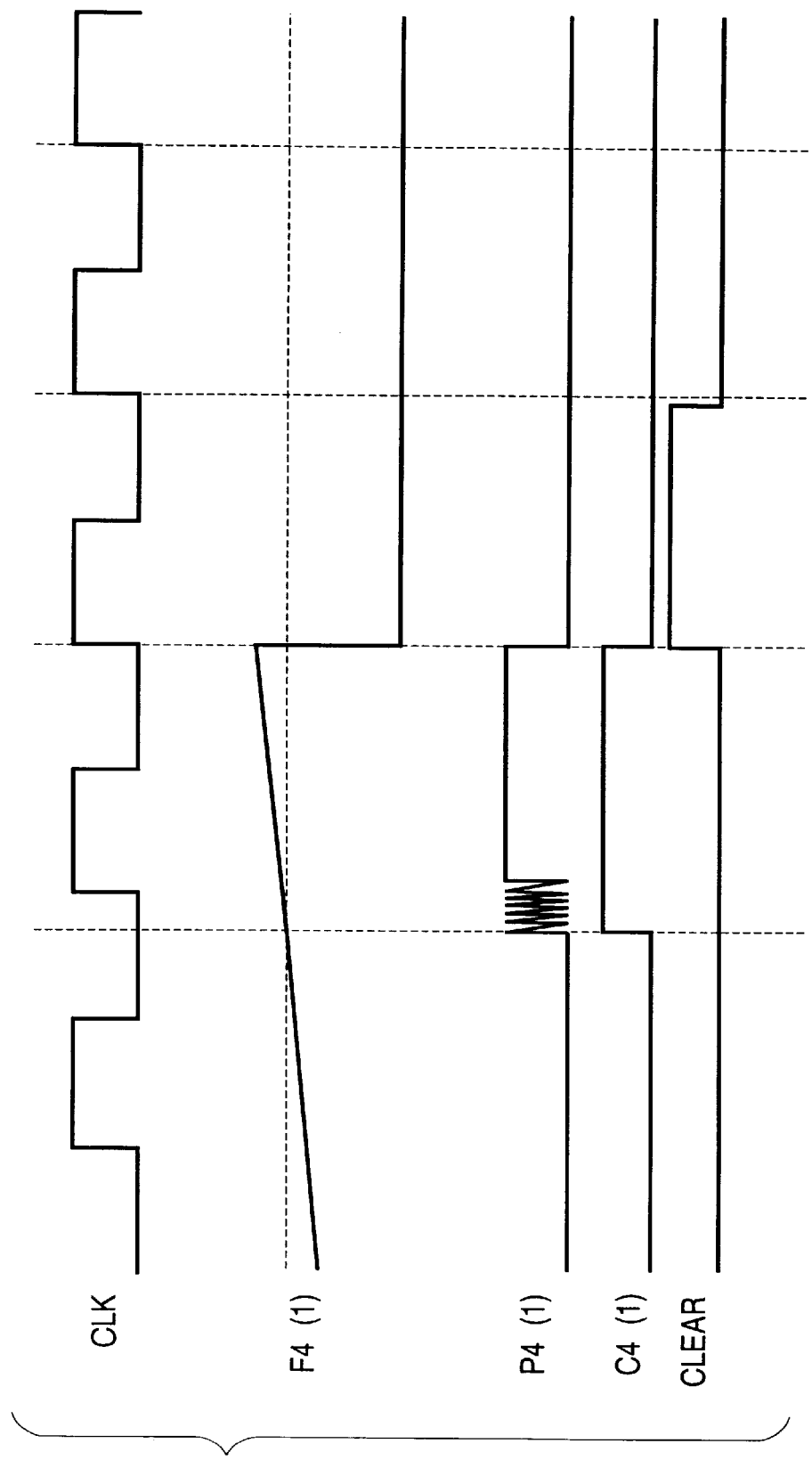
FIG. 19 is a timing chart showing signal wave forms in various parts in FIG. 18.

The flip-flops 9, 10, 11 so function as to eliminate the chattering at P4, whereby the output after the removal of chattering is released from C4. FIG. 19 is a wave form chart showing the removal of chattering. The chattering generated at the upshift of the signal P4(1) is removed in the signal C4(1).

In the present embodiment, one cycle of the CLK signal is divided into 511 portions, and the principle of such division will be explained in the following with reference to FIG. 20. DA4(2), F4(2) and C4(2) are signals in case the delay data set during a cycle of the CLK signal has a delay amount "0". The delay data in this case are "511". Also DA4(5), F4(5) and C4(5) indicate the signals delayed by a CLK signal. The delay data in this case is set at "0", and the DA0 signal is set at 511 with the delay of a cycle of the CLK signal in comparison with the above-mentioned case of the delay amount 0.

Consequently, the timing of upshift of the signal C4(5) is evidently delayed by a CLK signal from the upshift of the signal C4(2). The output of the 511-notation integrator 46 is from "0" to "511", and, with any value in this range being selected as the delay data, the upshift of the signal C4 falls between the upshifts of C4(2) and C4(5), so that one cycle of the CLK signal can be divided into 511 fractions.

Figure 20:
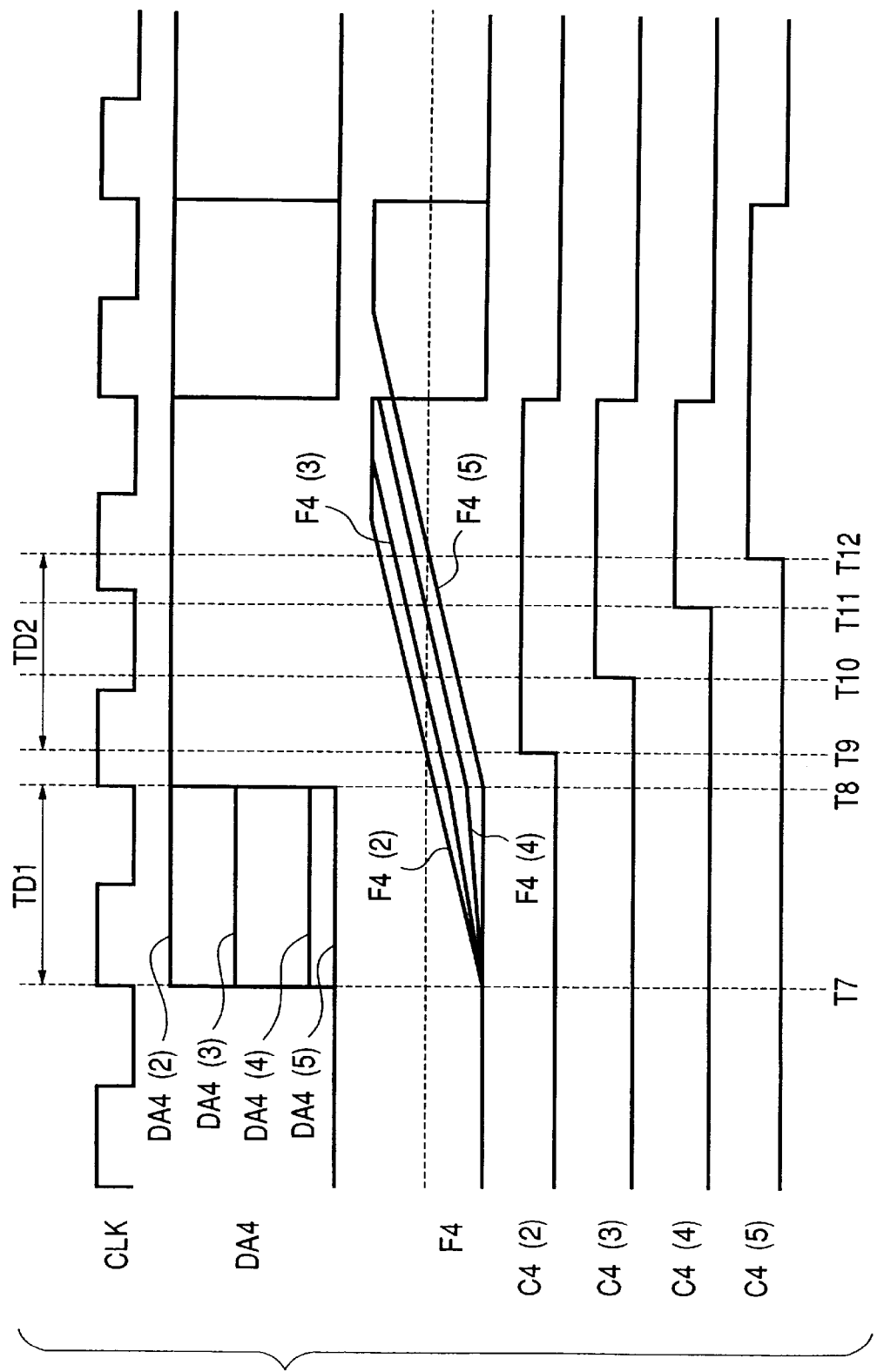
FIG. 20 is a chart showing the principle of a delayed wave form in FIG. 18.

As will be apparent from FIG. 20, the delay amount decreases with the increase of the delay data. The delay amounts 0, 1, . . . , 511 respectively correspond to the delay data 511, . . . , 1, 0, and the delay data can be obtained by representing the delay amount with a binary number and inverting such binary number. In case the output DA4 changes from "511" to "0", the delay data are not set because the signal is cleared by the Clear signal.

Figure 21:
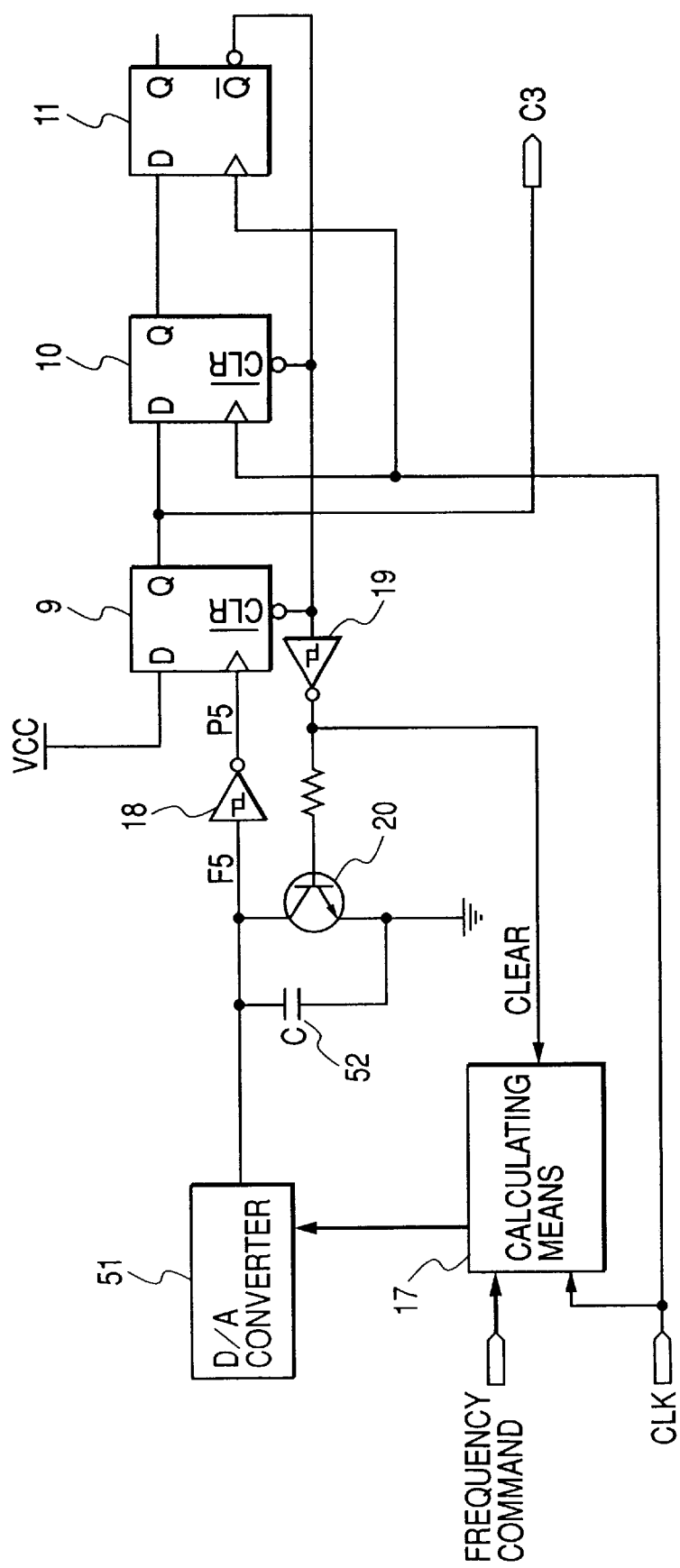
FIG. 21 is a block diagram showing a variation of the fourth embodiment.

FIG. 21 shows a configuration in which the D/A converter 3 is replaced by a current-output D/A converter 51 and the integral means is constituted by a capacitor. The signal wave forms are similar to FIG. 19, in which P4 is replaced by P5 and C4 by C5. As the D/A converter 51 is of a current output type, the capacitor 51 alone can constitute an integrator.

Figure 33:
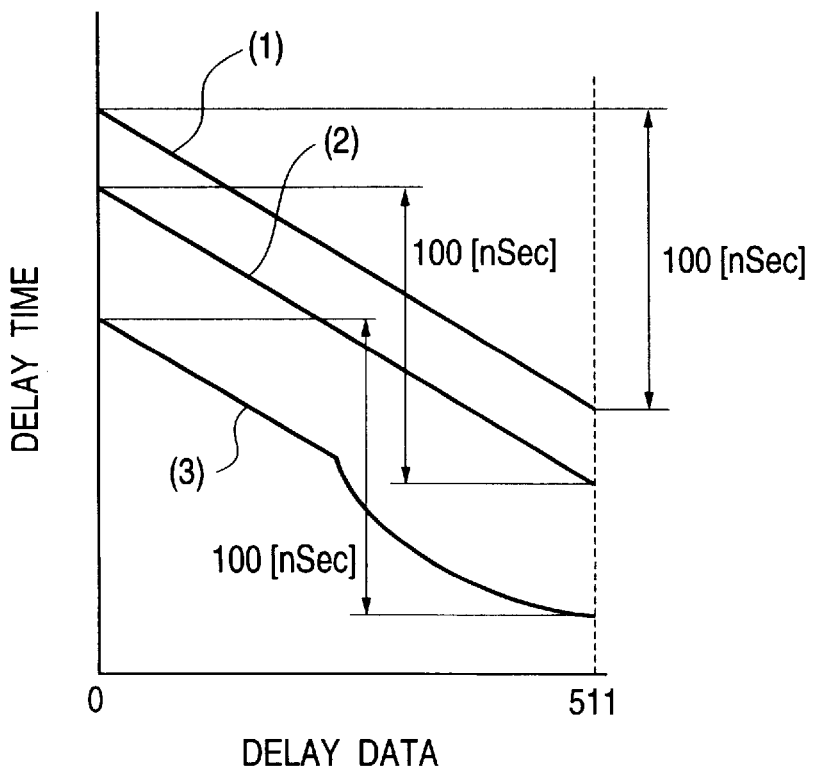
FIG. 33 is a chart showing the relationship between delayed data and delay time, as a function of the time constant of integral means 21.

The time constant of the integral means 21 is so selected that the output thereof at a delay data "511" does not exceed the boundary voltage between inputs "0" and "1" of the buffer 18 in the above-mentioned cycle of the CLK signal. FIG. 33 shows the relationship between the delay data and the delay time, as a function of the time constant. This chart shows an example of a cycle time of the CLK signal of 100 nanosecond, in which, in case the time constant is large, the relationship assumes a form (1) wherein the delay time decreases as the delay data (value set in the D/A converter 3) increases. A curve (2) corresponds to a case close to the above-mentioned boundary and shows a linear change as in the case (1). A curve (3) corresponds to a case beyond the above-mentioned boundary and shows a change to a curved form though the full scale is same as in other cases. Therefore, the boundary voltage is preferably not exceeded because of the above-mentioned facts.

Fifth embodiment

Figure 22:
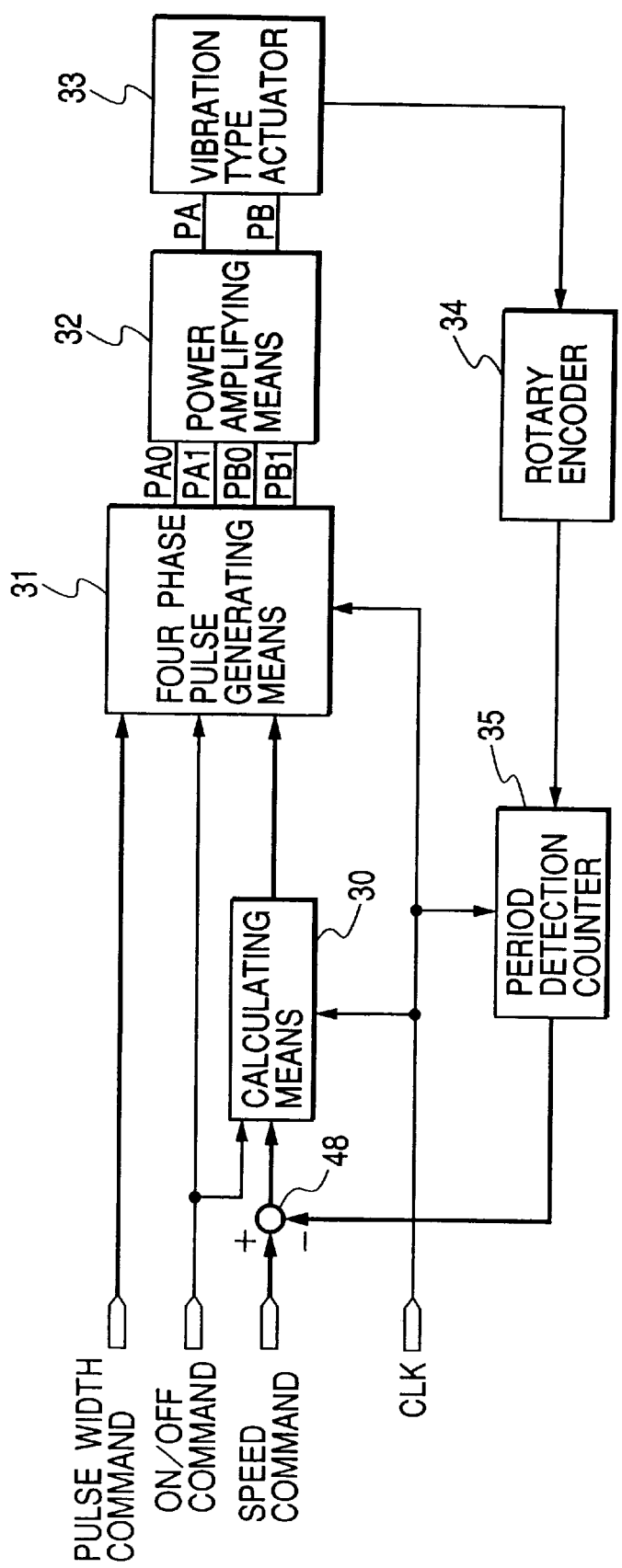
FIG. 22 is a block diagram of a fifth embodiment.
Figure 23:
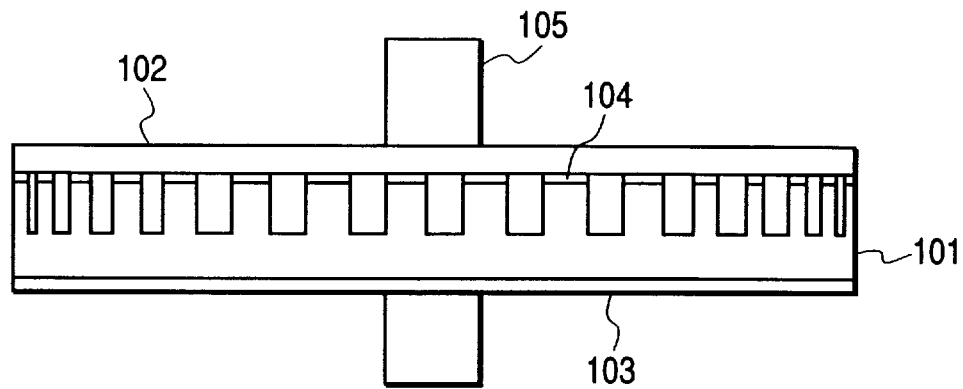
FIG. 23 is a view showing the configuration of a vibration type actuator.

FIG. 22 is a block diagram of a fifth embodiment of the present invention, and FIG. 23 is a lateral view showing an annular actuator as an example of the vibration type actuator. At first there will be given a brief explanation on the actuator.

Referring to FIG. 23, a vibration member is constituted by adhering, to a face of an annular elastic member, a piezoelectric element 103 serving as an electro-mechanical energy conversion element, and a rotor 102 serving as a contact member is maintained in pressure contact with the elastic member 101 by means of unrepresented pressurizing means.

There are also shown a friction member 104 adhered to the elastic member 101 and sandwiched between the elastic member 101 and the rotor 102, and a rotary shaft 105 connected to the center of the rotor.

Figure 24:
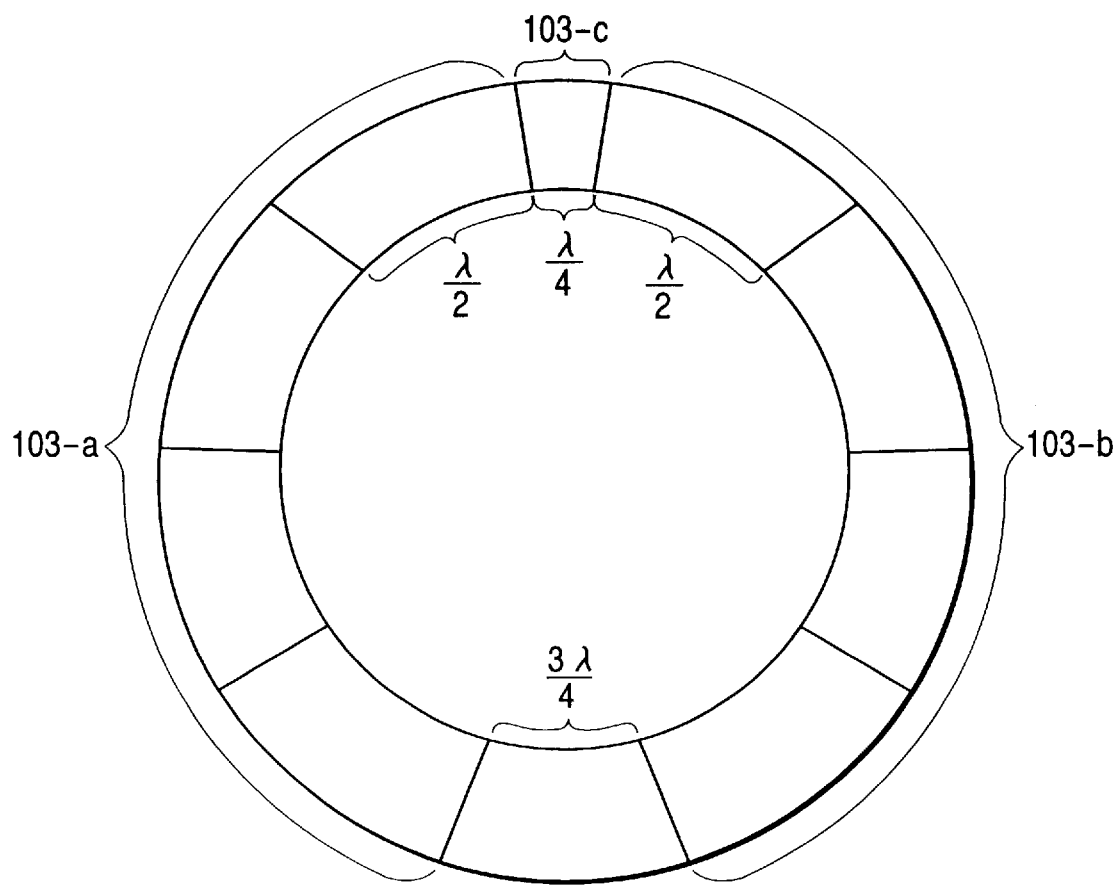
FIG. 24 is a view showing the electrode structure of a piezoelectric element.

The surface of the piezoelectric member 103 is divided into plural electrodes of a shape shown in FIG. 24. The electrodes are composed of two driving electrode groups (103-a, 103-b), and a sensor electrode 103-c. Hereafter the electrodes 103-a, 103-b, 103-c are respectively called phase A, phase B and phase S. The vibration type actuator shown in FIG. 23 is so constructed as to supply the phases A and B respectively with AC voltages of a phase difference of 90° in time thereby generating a traveling vibration wave in the elastic member 101 and to transmit the force of such vibration to the rotor 102 maintained in pressurized contact with the elastic member across the frictional member 104 thereby rotating the rotor 102.

Thus the vibration type actuator generates relative rotation between the rotor 102 and the elastic member 104 by the application of two AC voltages. Such function will be explained further in the following with reference to a block diagram shown in FIG. 22.

The present embodiment shows an example of the circuit for controlling the speed of the vibration type actuator, and a pulse generator provided in 4-phase pulse generating means has a configuration according to any of the foregoing first to fourth embodiments achieving high precision and a high resolution, whereby a high precise speed control is achieved.

In FIG. 22, there are shown a vibration type actuator 33 of the above-described configuration; a known rotary encoder 34 for detecting the rotation speed of the vibration type actuator 33; a period detection counter 35 for counting the period of the output pulses of the rotary encoder 34 which outputs the pulses of a frequency proportional to the rotation speed of the vibration type actuator 33; a subtractor 48 for subtracting, from a speed command supplied from unrepresented command means, the output of the period detection counter 35 varying according to the rotation speed of the vibration type actuator 33; and calculating means 30 for integrating the output of the subtractor 48 and adding the integrated value to a predetermined initial frequency thereby determining the driving frequency of the vibration type actuator 33.

In the calculating means 30, the integral value thereof is reset in case an ON/OFF command from the unrepresented command means is OFF.

Four-phase pulse generating means 31 generates pulses of four phases, with mutual phases differences of 90°, of a pulse width and a frequency according to a pulse width command from the unrepresented command means and a frequency command from the calculating means 30, and all the output pulses are turned off in case the ON/OFF command is OFF. Power amplifying means 32 generates two-phase high AC voltages of a phase difference of 90° according to the 4-phase pulses from the 4-phase pulse generating means 31.

In case the ON/OFF command is OFF, the output frequency of the 4-phase pulse generating means 31 becomes equal to the initial frequency mentioned above. When the ON/OFF command is turned on, there is initiated the drive with such initial frequency as the driving frequency, and the driving frequency is decreased and approaches to the resonance frequency according to the difference between the speed command and the output of the counter 35. Thus the rotation speed of the vibration type actuator 33 is increased and approaches to the speed command. The speed control is achieved in this manner.

In the foregoing there has been explained an example of the integral control in which the calculating means 30 executes a single integral, but it is also possible to adopt double integral method in which the integrated result is further integrated or to add the integration result and the output of the subtractor 48 with a predetermined ratio. It is naturally possible also to apply a control theory of higher level such as fuzzy control in the calculating method of the calculating means 30.

Figure 25:
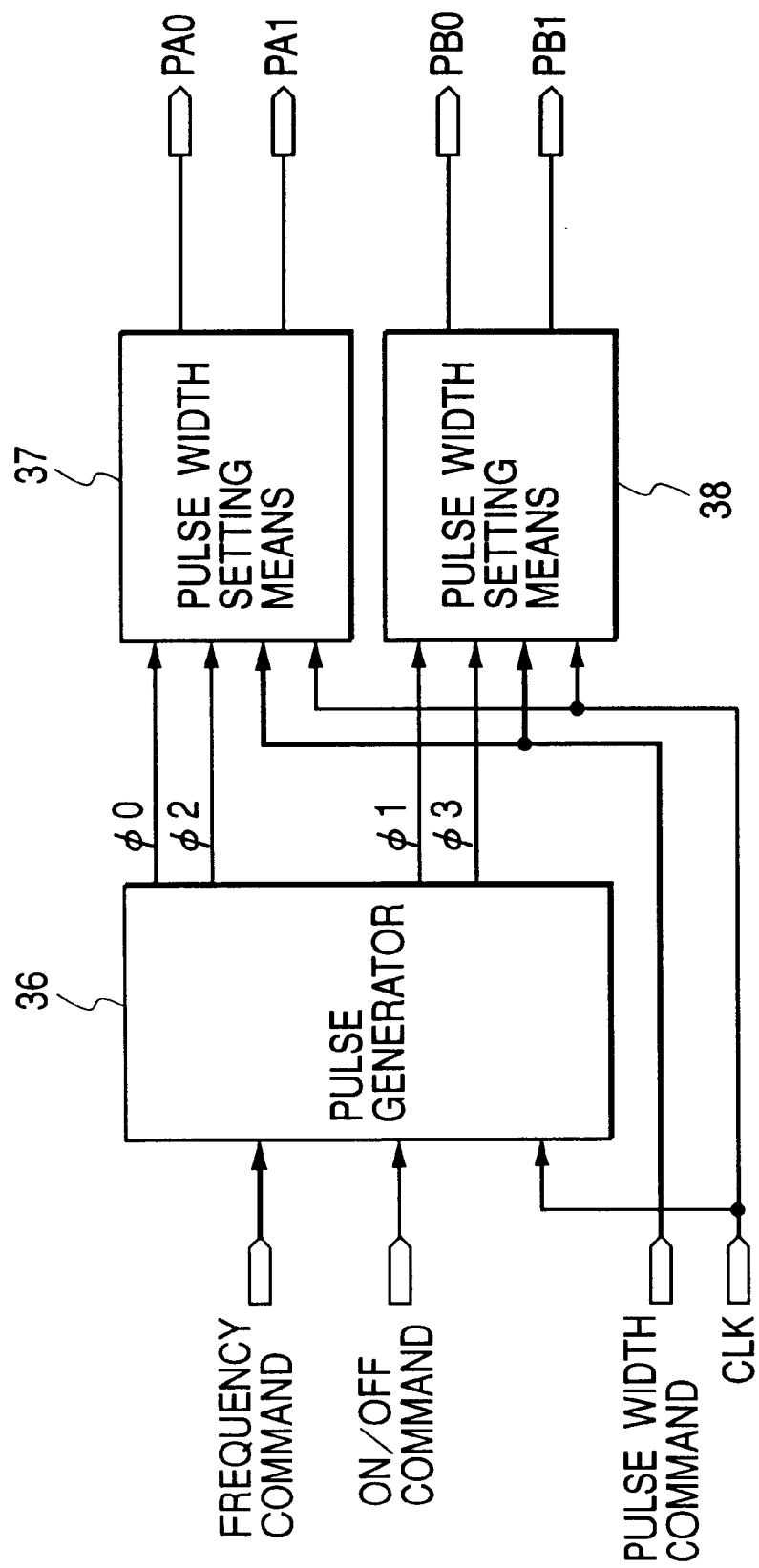
FIG. 25 is a block diagram showing the configuration of 4-phase pulse generating means.

FIG. 25 shows the internal configuration of the 4-phase pulse generating means 31. A pulse generator 36 generates, according to the frequency command and the ON/OFF command from the unrepresented command means, 4-phase pulses of a predetermined pulse width and a frequency based on the frequency command. All the output pulses are turned off in case the ON/OFF command is OFF.

Figure 26:
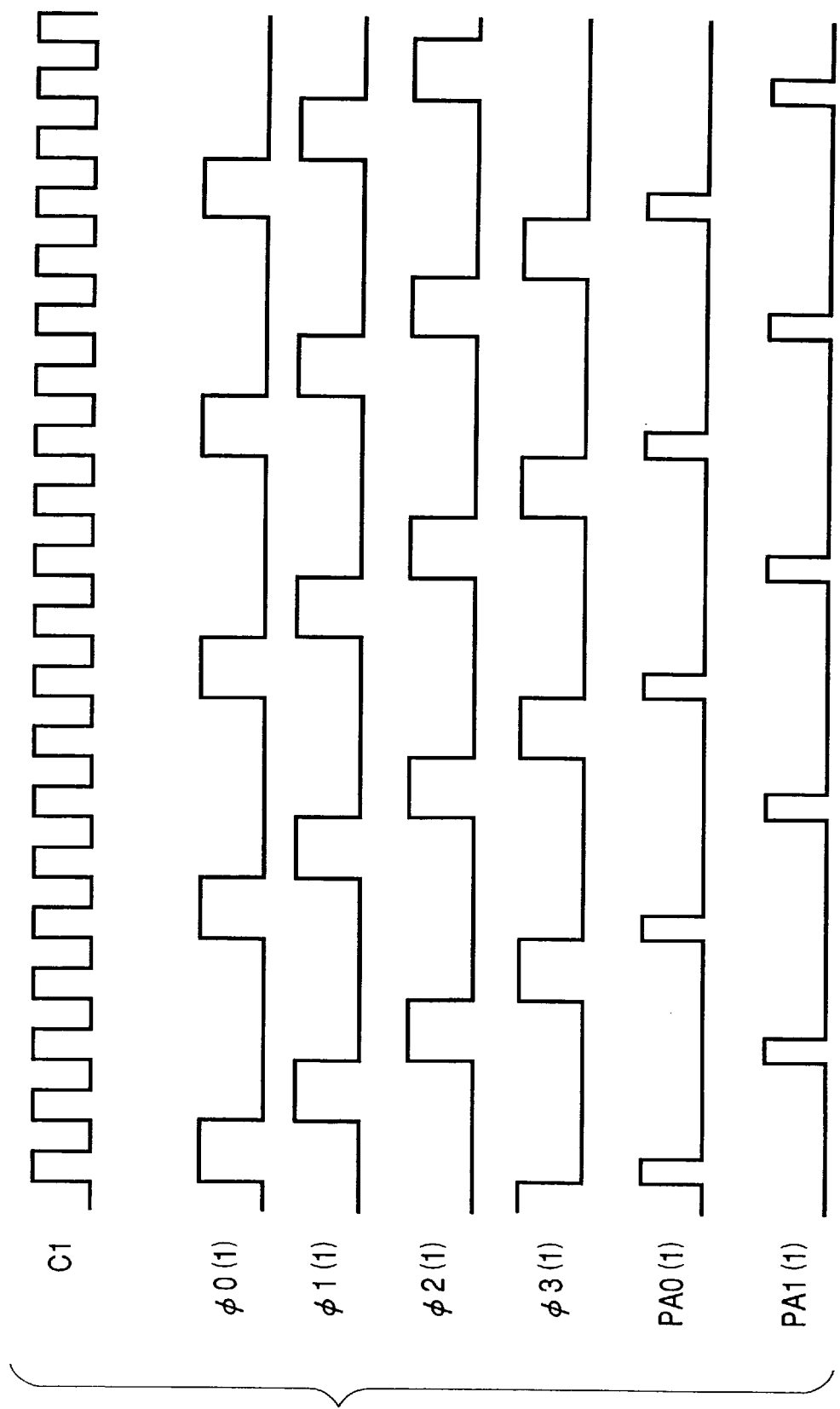
FIGS. 26 and 27 are timing charts showing signal wave forms in various parts in FIG. 25.
Figure 27:
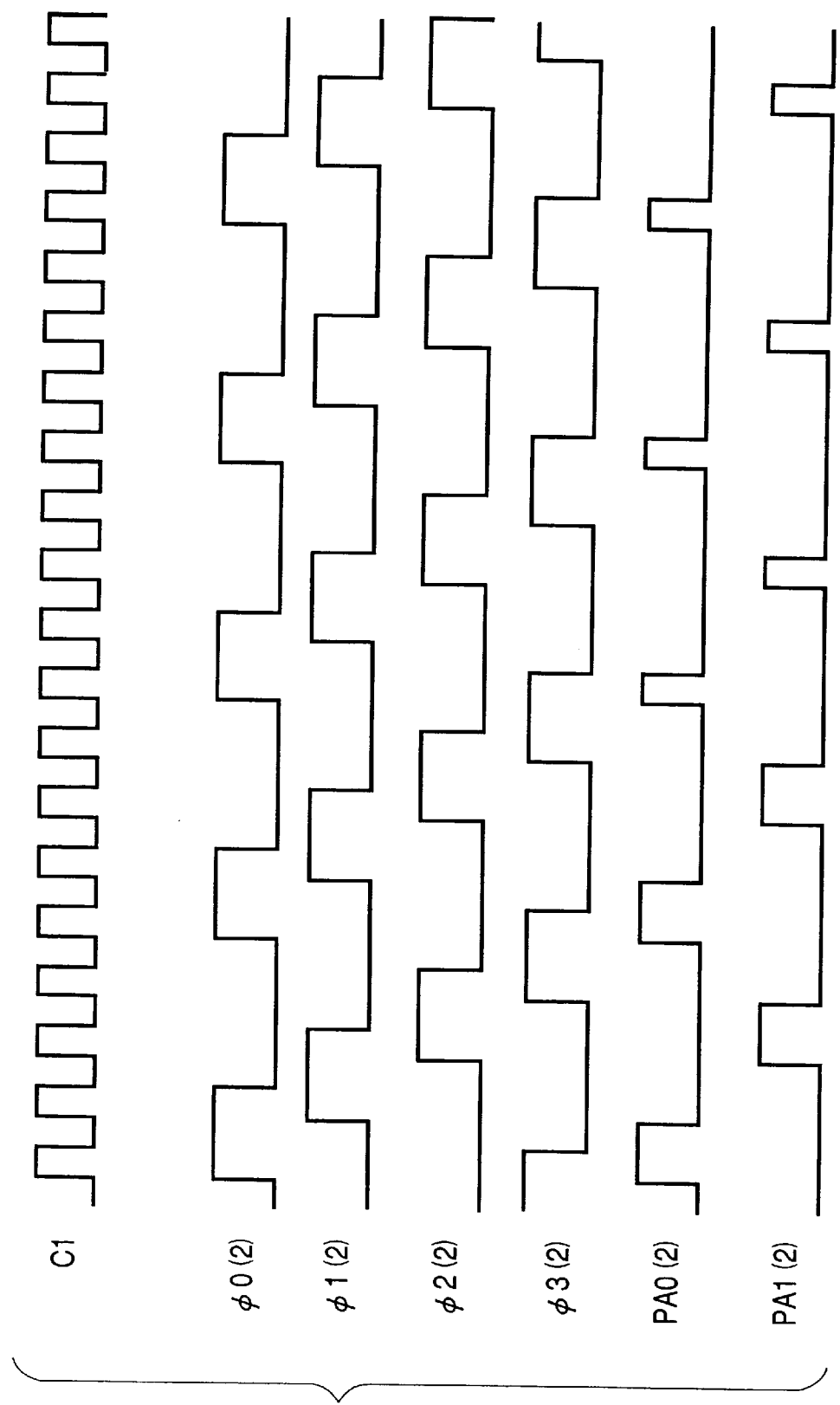

Pulse width setting means 37, 38 are provided for varying the pulse width of the output pulses from the pulse generator 36 into a pulse width corresponding to a pulse width command from the unrepresented command means. In case the pulse width command exceeds the output pulse width of the pulse generator 36, there is preferentially selected the output pulse width of the pulse generator 36. FIGS. 26 and 27 show examples of the signal wave forms.

The illustrated wave forms correspond to a case in which the circuit shown in FIG. 7 is adopted as the reference pulse generating means of the pulse generator 36. C1 is the output wave form of the circuit shown in FIG. 7, according to which the output pulses (Φ0, Φ1, Φ2, Φ3) of the pulse generator 36 are generated in succession. The pulses Φ0, Φ1, Φ2, Φ3 are displaced by 90° in succession. The pulses Φ0 to Φ3 have a pulse width corresponding to a cycle period of the pulses C1 in case of FIG. 26, and a pulse width corresponding to a cycle period and a half of the pulses C1 in case of FIG. 27.

Figure 28:
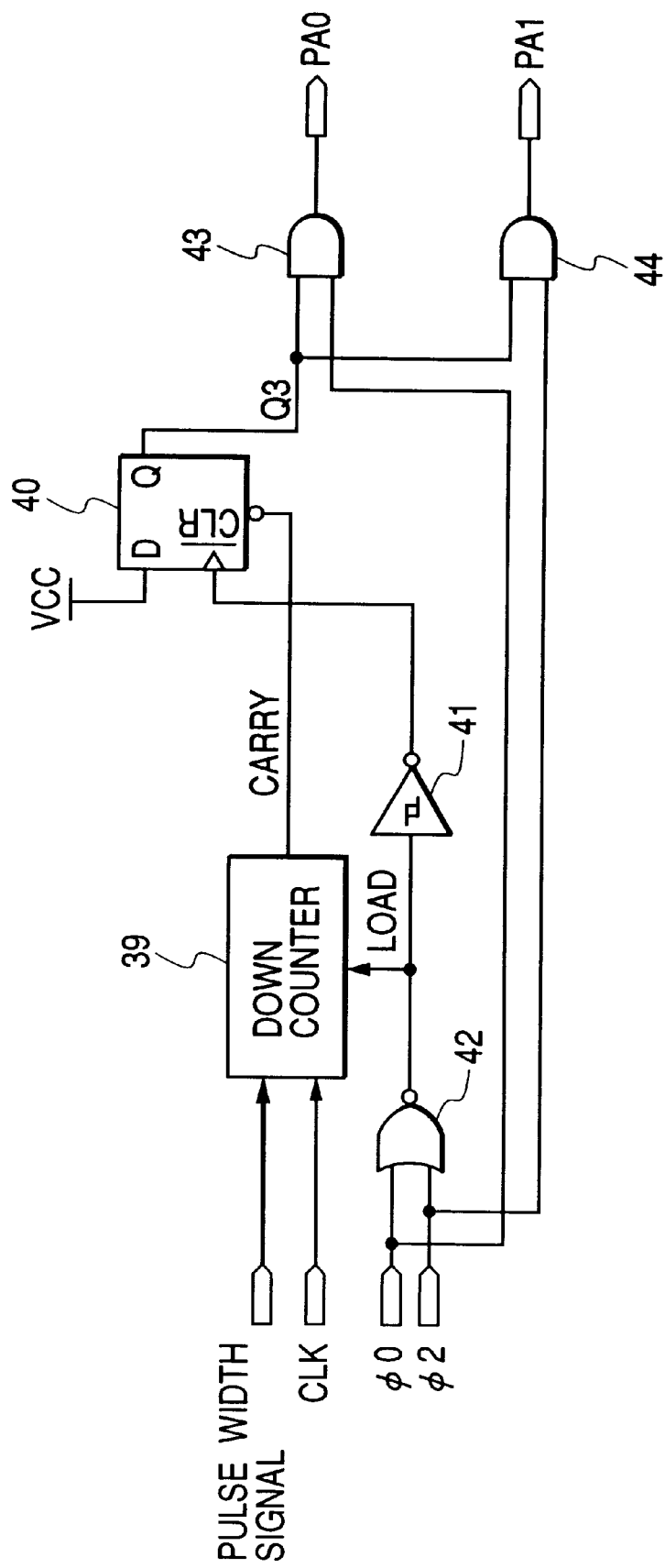
FIG. 28 in a circuit diagram showing the configuration of pulse width setting means 37.

FIG. 28 shows an example of the circuit of the pulse width setting means, wherein a down counter 39 sets a pulse width command from the unrepresented command means in a counter at the upshift of the CLK signal in a state Load=1, and executes a stepwise decrement of the counter value at the upshift of each CLK signal in a state Load=0.

Figure 29:
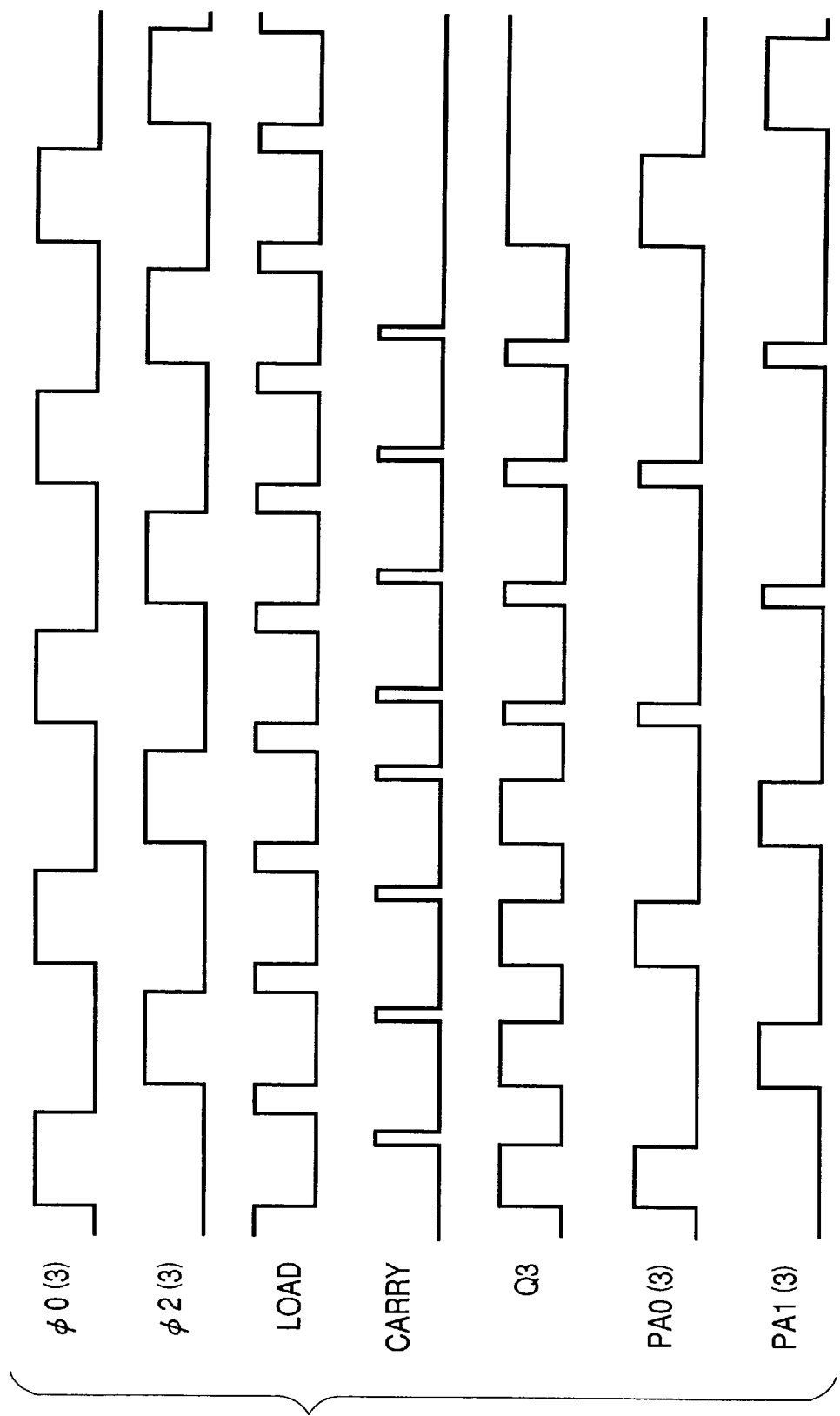
FIG. 29 is a timing chart showing signal wave forms in various parts in FIG. 28.

There are also shown a D-flip-flop 40 with a reset port, an inverter 41, an NOR element 42, and AND elements 43, 44. FIG. 29 is a wave form chart showing signals in various parts.

The pulse width command is set in the down counter 39 between the signals Φ0(3) and Φ2(3), and the down counting is started when Φ0(3) or Φ2(3) is "1". A Carry signal is outputted after the down counting is continued for a duration determined by the pulse width command, whereupon the signals PA0 and PA1 become "0". If the pulse width command is large, the signals Φ0, Φ2 become zero prior to the output of the Carry signal, whereby PA0 and PA1 also become zero.

Figure 30:
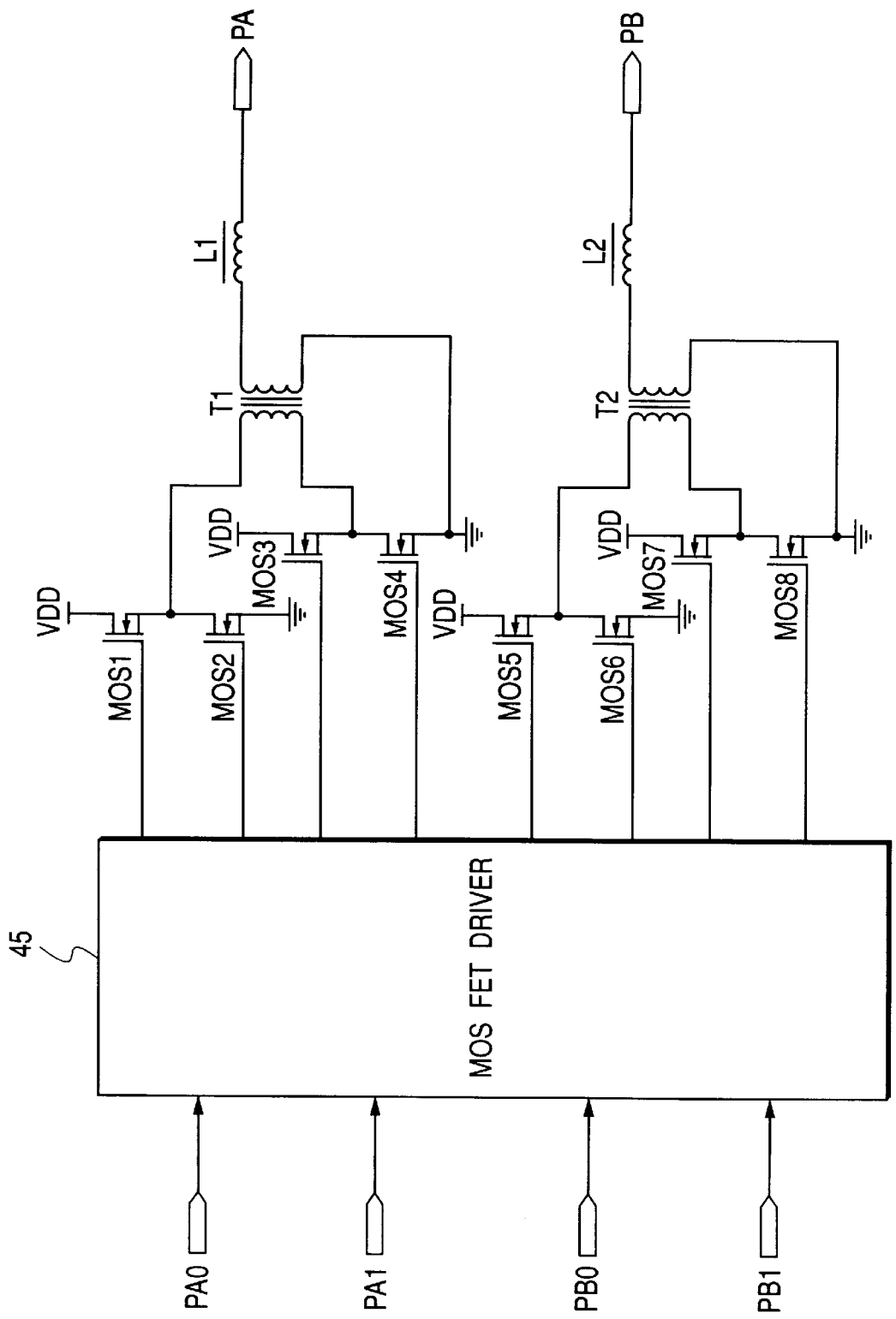
FIG. 30 is a block diagram showing the configuration of electric power amplifying means.

FIG. 30 shows the configuration of the power amplifying means. A driver 45 for driving MOSFET's turns on MOS1 and turns off MOS2 in a state PA0=1, but turns off MOS1 and turns on MOS2 in a state PA0=0.

Similarly MOS3, MOS4 are provided corresponding to PA1, MOS5, MOS6 are provided corresponding to PB0, and MOS7, MOS8 are provided corresponding to PB1. The outputs of the MOSFET's are amplified by transformers T1, T2 and are applied, through inductances L1, L2 to the vibration type actuator.

Figure 31:
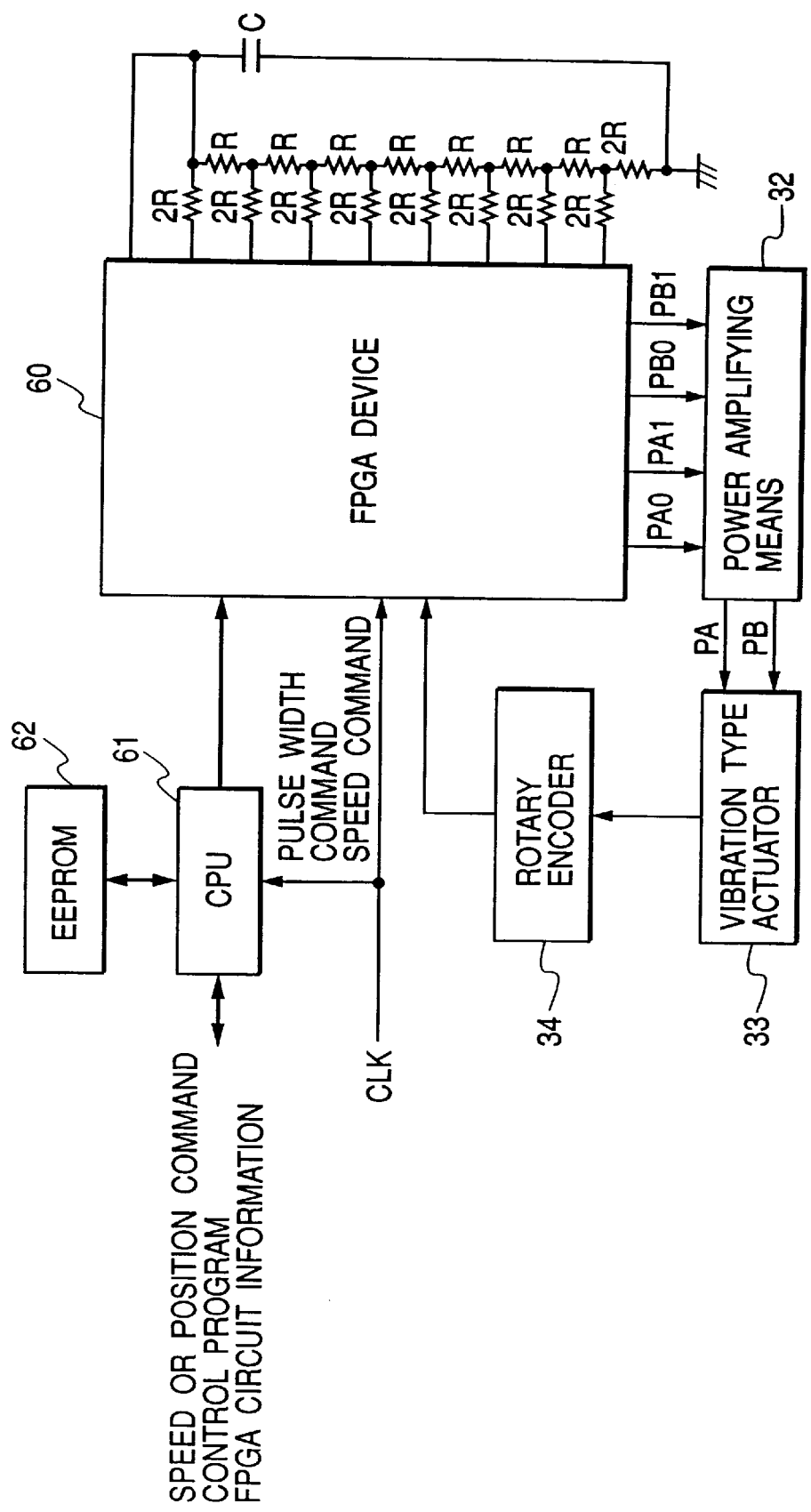
FIG. 31 is a block diagram showing a variation of the fifth embodiment.

FIG. 31 shows a programmable logic device in which logic circuits can be formed by a program and which is provided therein with a digital circuit shown in FIG. 22.

In FIG. 31, there are shown a known FPGA device 60 of which circuit structure can be varied by a program; a known CPU 61 for sending the speed command to the FPGA device 60 and programming the circuit structure thereof; and a known EEPROM 62 with a flush memory storing the program for the CPU 61 and the program for the FPGA device 60.

D/A converter means is composed of ladder-connected resistors R, 2R, and a low-pass filter is constituted by a capacitor C and the output resistor R of the ladder resistors.

In the device 60, circuit information is programmed by the CPU 61 in such a manner that the period detection counter for detecting the period of the output pulses of the encoder 34, a calculation process portion for calculating the difference between the speed command and the period detected by the period detection counter thereby determining the driving frequency of the vibration type actuator 33, and a digital circuit of the pulse generating portion, excluding the D/A converter means and the low-pass filter, for generating the 4-phase pulses for driving the power amplifying means 32 are incorporated. The CPU 61 is so programmed as to receive the commands on the speed and position from the unrepresented command means and to accordingly send the speed command to the device 60, and functions according to a program stored in a ROM 62.

The circuit information of the device 60 and the program of the CPU 61 are transferred to the EEPROM 62 from the unrepresented command means, according to a transfer program provided in advance in the CPU 61.

What is claimed is:

1. A control device for a vibration type actuator in which the driving force is obtained by applying a periodic signal to an electro-mechanical energy conversion element, the control device comprising:

a periodic signal forming circuit for receiving pulses of a reference period and forming a signal of a period of an integral multiple of said reference period of the pulses;

a data setting circuit for setting data for dividing, with an integer, one period of the pulses of said reference period;

an analog signal forming circuit for forming an analog signal based on the signal from said periodic signal forming circuit and the data of said data setting circuit;

a low-pass filter for entering the analog signal from said analog signal forming circuit;

a conversion circuit for converting the output of said low-pass filter, by comparison thereof with a predetermined level, into pulse signals; and a driving circuit for forming the periodic signal from the pulse signal from said conversion circuit thereby driving said electro-mechanical energy conversion element.

2. A control device according to claim 1, wherein said analog signal forming circuit is adapted to alternately form analog signals of first and second values at a timing according to the period of the signal formed by said periodic signal forming circuit, and also to form an analog signal of a third value between said first and second values according to the data of said data setting circuit at the timing of switching from the analog signal of the first value to that of the second value.

3. A control device according to claim 2, wherein the analog signal of said third value is formed during a period of the pulses of said reference period.

4. A control device according to claim 1, wherein said periodic signal forming circuit is adapted to determine the value of said integral multiple according to a frequency command, and the data of said data setting circuit is also determined according to said frequency command.

5. A control device according to claim 4, wherein said frequency command is given by a digital value of plural bits, and the value of said integral multiple is determined by the data of an upper bit portion of said digital value while the data of said data setting circuit is determined by the data of a lower bit portion.

6. A control device for a vibration type actuator in which the driving force is obtained by applying a periodic signal to an electro-mechanical energy conversion element, the control device comprising:

an analog signal forming circuit for receiving pulses of a reference period and forming a first analog signal and a second analog signal based on an integral multiple of the period of said pulses and also forming a third analog signal of a value between those of said first and second analog signals for a duration shorter than the period of the integral multiple of the period of said pulses;

a low-pass filter for entering the analog signals from said analog signal forming circuit;

a conversion circuit for converting the output of said low-pass filter, by comparison thereof with a predetermined level, into pulse signals; and a driving circuit for forming said periodic signal from the pulse signal from said conversion circuit thereby driving said electro-mechanical energy conversion element.

7. A control device according to claim 6, wherein said third analog signal is formed during a period of the pulses of said reference period.

8. A control device according to claim 6, wherein said analog signal forming circuit is adapted to form the third analog signal prior to the switching from the first analog signal to the second analog signal.

9. A control device according to claim 6, wherein the value of said integral multiple is determined according to a frequency command, and the value of said third analog signal is determined according to said frequency command.

10. A control device for a vibration type actuator in which the driving force is obtained by applying a periodic signal to an electro-mechanical energy conversion element, the control device comprising:

a periodic signal forming circuit for receiving pulses of a reference period and forming a signal of a period of an integral multiple of the reference period of said pulses;

a data setting circuit for setting data for dividing, with an integer, one period of the pulses of said reference period;

an analog signal forming circuit for forming an analog signal based on the signal from said periodic signal forming circuit and the data of said data setting circuit;

an integral circuit for receiving the analog signal from said analog signal forming circuit;

a conversion circuit for converting the output of said integrating circuit, by comparison thereof with a predetermined level, into a pulse signal; and a driving circuit for forming said periodic signal from the pulse signal from said conversion circuit thereby driving said electro-mechanical energy conversion element.

11. A control device according to claim 10, wherein said analog signal forming circuit is adapted to alternately form analog signals of first and second values at a timing according to the period of the signal formed by said periodic signal forming circuit, and also to form an analog signal of a third value between said first and second values according to the data of said data setting circuit at the timing of switching from the analog signal of the first value to that of the second value.

12. A control device according to claim 11, wherein the analog signal of said third value is formed during a period of the pulses of said reference period.

13. A control device according to claim 10, wherein said periodic signal forming circuit is adapted to determine the value of said integral multiple according to a frequency command, and the data of said data setting circuit is also determined according to said frequency command.

14. A control device according to claim 13, wherein said frequency command is given by a digital value of plural bits, and the value of said integral multiple is determined by the data of an upper bit portion of said digital value while the data of said data setting circuit is determined by the data of a lower bit portion.

15. A control device for a vibration type actuator in which the driving force is obtained by applying a periodic signal to an electro-mechanical energy conversion element, the control device comprising:

an analog signal forming circuit for receiving pulses of a reference period and forming a first analog signal and a second analog signal based on a period corresponding to an integral multiple of the period of said pulses and also forming a third analog signal of a value between those of the first and second analog signals for a duration shorter than the integral multiple of said period of the pulses;

an integrator for receiving the analog signal from said analog signal forming circuit;

a conversion circuit for converting the output of said integrator, by comparison thereof with a predetermined level, into pulse signals; and a driving circuit for forming the periodic signal from the pulse signal from said conversion circuit thereby driving said electro-mechanical energy conversion element.

16. A control device according to claim 15, wherein said third analog signal is formed during a period of the pulses of said reference period.

17. A control device according to claim 15, wherein said analog signal forming circuit is adapted to form the third analog signal prior to the switching from the first analog signal to the second analog signal.

18. A control device according to claim 15, wherein the value of said integral multiple is determined according to a frequency command, and the value of said third analog signal is determined according to said frequency command.

19. A control system for a vibration type actuator in which the driving force is obtained by applying a periodic signal to an electro-mechanical energy conversion element, the control device comprising:

an analog signal forming circuit for receiving pulses of a reference period and forming a first analog signal at a timing based on a period corresponding to an integral multiple of the period of the pulses and also forming a second analog signal of a value smaller than that of the first analog signal for a duration shorter than the integral multiple of the period of the pulses;

a low-pass filter for entering the analog signals from said analog signal forming circuit;

a conversion circuit for converting the output of said low-pass filter, by comparison thereof with a predetermined level, into a pulse signal; and a driving circuit for forming the periodic signal from the pulse signal from said conversion circuit thereby driving the electro-mechanical energy conversion element.

20. A control device according to claim 19, wherein the second analog signal is formed during a period of the pulses of the reference period.

21. A control device according to claim 19, wherein said analog signal forming circuit is adapted to form the second analog signal of a value smaller than that of the first analog signal prior to the formation of the first analog signal.

22. A control device according to claim 19, wherein the value of the integral multiple is determined according to a frequency command, and the value of the second analog signal is determined according to the frequency command.

23. A control device according to claim 19, wherein said low-pass filter is reset in response to the pulse signal from said conversion circuit.

24. A control device for a vibration type actuator in which the driving force is obtained by applying a periodic signal to an electro-mechanical energy conversion element, the control device comprising:

an analog signal forming circuit for receiving pulses of a reference period and forming a first analog signal at a timing based on a period corresponding to an integral multiple of the period of the pulses and also forming a second analog signal of a value smaller than that of the first analog signal for a duration shorter than the integral multiple of the period of the pulses;

an integrator for receiving the analog signal from said analog signal forming circuit;

a conversion circuit for converting the output of said integrator, by comparison thereof with a predetermined level, into a pulse signal; and a driving circuit for forming the periodic signal from the pulse signal from said conversion circuit thereby driving the electro-mechanical energy conversion element.

25. A control device according to claim 24, wherein the second analog signal is formed during a period of the pulses of the reference period.

26. A control device according to claim 24, wherein said analog signal forming circuit is adapted to form the second analog signal of a value smaller than that of the first analog signal prior to the formation of the first analog signal.

27. A control device according to claim 24, wherein the value of the integral multiple is determined according to a frequency command, and the value of the second analog signal is determined according to the frequency command.

28. A control device according to claim 24, wherein said integrating circuit is reset in response to the pulse signal from said conversion circuit.

* * * * *

UNITED STATES PATENT AND TRADEMARK OFFICE
CERTIFICATE OF CORRECTION

PATENT NO. : 6,215,224 B1
DATED : April 10, 2001
INVENTOR(S) : Kenichi Kataoka et al.

It is certified that error appears in the above-identified patent and that said Letters Patent is hereby corrected as shown below:

Column 1,
Line 26, "period;" should read -- period; and --.
Line 42, "vary" should read -- very --.

Column 8,
Line 2, "same" should read -- the same --.
Line 52, "same" should read -- the same --.

Column 9,
Line 22, "form" should read -- for --.

Column 11,
Line 1, "nanosecond," should read -- nanoseconds, --.
Line 7, "same" should read -- the same --.

Signed and Sealed this

Twenty-ninth Day of January, 2002

*Attest:*

*Attesting Officer*

JAMES E. ROGAN
*Director of the United States Patent and Trademark Office*